US012706661B2

(12) United States Patent
Zhu et al.

(10) Patent No.: US 12,706,661 B2
(45) Date of Patent: Aug. 11, 2026

(54) INDICATING UPLINK BEAMS AND SOUNDING REFERENCE SIGNAL RESOURCES

(71) Applicant: Samsung Electronics Co., Ltd., Suwon-si (KR)

(72) Inventors: Dalin Zhu, Allen, TX (US); Md. Saifur Rahman, Plano, TX (US); Emad Nader Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 18/776,183

(22) Filed: Jul. 17, 2024

(65) Prior Publication Data

US 2025/0047357 A1 Feb. 6, 2025

Related U.S. Application Data

(60) Provisional application No. 63/530,194, filed on Aug. 1, 2023.

(51) Int. Cl.

*H04B 7/06* (2006.01)
*H04B 7/08* (2006.01)
*H04W 72/23* (2023.01)

(52) U.S. Cl.

CPC ......... *H04B 7/06966* (2023.05); *H04B 7/088* (2013.01); *H04W 72/23* (2023.01)

(58) Field of Classification Search

CPC .......................... H04B 7/0404; H04B 7/06966; H04B 7/0608; H04B 7/0695; H04B 7/06956;

(Continued)

(56) References Cited

U.S. PATENT DOCUMENTS

2018/0254863 A1* 9/2018 Choi ..................... H04W 72/21
2021/0127379 A1* 4/2021 Harrebek ........... H04B 7/06966

(Continued)

FOREIGN PATENT DOCUMENTS

EP 4027726 A1 7/2022
WO 2021118307 A1 6/2021

OTHER PUBLICATIONS

Samsung, "Enhancement on multi-beam operations", R1-1908502, 3GPP RAN WG1 98, Prague Czech Republic, Aug. 17, 2019. (Year: 2019).*

(Continued)

*Primary Examiner* — Sophia Vlahos

(57) ABSTRACT

Methods and apparatuses for indicating uplink (UL) beams and sounding reference signal (SRS) resources. A method performed by a user equipment (UE) includes receiving, in a downlink control information (DCI) format, (i) a SRS resource indicator (SRI) and (ii) a transmission configuration indication (TCI) codepoint mapped to one or more first TCI states and determining, based on the SRI, a SRS resource and a physical uplink shared channel (PUSCH) associated with the SRS resource. The method further includes determining, based on the one or more first TCI states, a spatial filter for transmitting the PUSCH; and transmitting the PUSCH using the determined spatial filter.

15 Claims, 12 Drawing Sheets

(58) Field of Classification Search
CPC ... H04B 7/06958; H04L 5/0044; H04W 72/23
See application file for complete search history.

(56) References Cited

U.S. PATENT DOCUMENTS

| | | | | |
|---|---|---|---|---|
| 2022/0239440 | A1 | 7/2022 | Go et al. | |
| 2025/0030512 | A1* | 1/2025 | Muruganathan | H04W 72/1268 |
| 2025/0185025 | A1* | 6/2025 | Yuan | H04W 72/232 |
| 2025/0261265 | A1* | 8/2025 | Huang | H04W 8/22 |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)" ETSI TS 138 321 V16.1.0, Jul. 2020, 153 pages.

"5G; NR; Radio Resource Control (RRC) protocol specification (3GPP Ts 38.331 version 16.1.0 Release 16)", ETSI TS 138 331 V16.1.0, Jul. 2020, 886 pages.

International Search Report and Written Opinion issued Oct. 30, 2024 regarding International Application No. PCT/KR2024/011163, 8 pages.

* cited by examiner

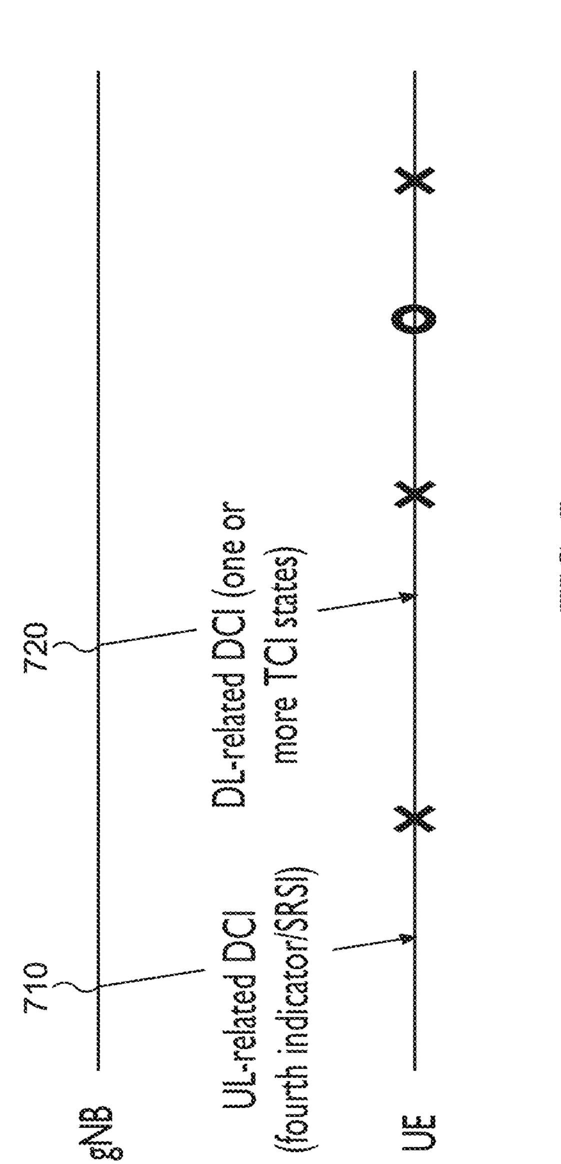
FIG. 7

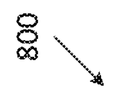
× When the fourth indicator/SRSI indicated in the UL-related DCI could have become applicable
O When the one or more TCI states indicated in the DL-related DCI could have become applicable
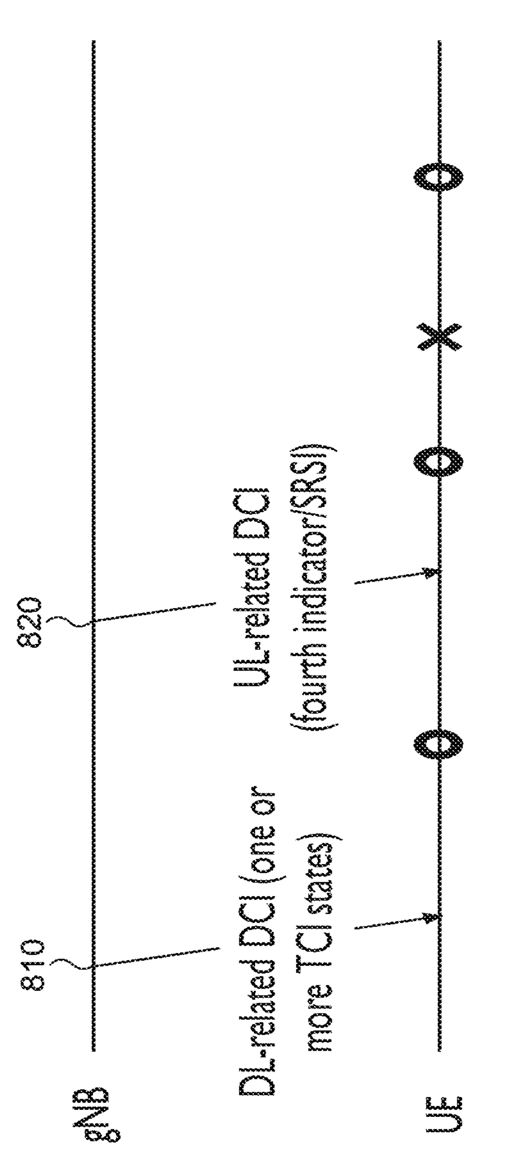
FIG. 8

| Values of the fourth indicator/SRSI | Configured TCI states/TCI state IDs |
|---|---|
| '00' | TCI-State with TCI state ID #1 |
| '00' | TCI-State with TCI state ID #2 |
| ... | ... |
| '10' | TCI-State with TCI state ID #L |

| SRI codepoints | SRI-1 | SRI-2 |
|---|---|---|
| '0' | 1 | 2 |
| '1' | 3 | N/A |
| ... | ... | ... |
| '6' | 5 | 3 |
| '7' | N/A | 6 |

| SRIs/values of SRI | TCI states/TCI state IDs |
|---|---|
| '0' | TCI-State with TCI state ID #1 |
| '1' | TCI-State with TCI state ID #2 |
| ... | ... |
| 'L-1' | TCI-State with TCI state ID #L |

| SRI codepoints/SRI codepoint indexes/IDs | TCI states/TCI state IDs |
|---|---|
| '0' | TCI-State with TCI state ID #1 |
| '1' | TCI-State with TCI state ID #2 |
| ... | ... |
| 'L-1' | TCI-State with TCI state ID #L |

1200

SRI(s) activation/deactivation MAC CE

| SRI codepoints | SRI-1 (first SRI) | SRI-2 (second SRI) |
| --- | --- | --- |
| '0' | 1 | 2 |
| '1' | 3 | N/A |
| ... | ... | ... |
| '6' | 5 | 3 |
| '7' | N/A | 6 |

SRI-1 (or first SRI) of SRI codepoint '6', i.e., SRI #5, is used to determine a SRS resource from the first SRS resource set and corresponding UL TX spatial filter(s) for transmitting the SRS resource

- SRI codepoint '6' is indicated (in a SRI field of a DCI, e.g., of DCI format 0_1/0_2/1_1/1_2 with or without UL/DL assignment)
- SRI index indicator (from one or more indicated TCI states) is set to 'first'
- A first and a second SRS resource sets are configured

FIG. 12

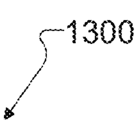
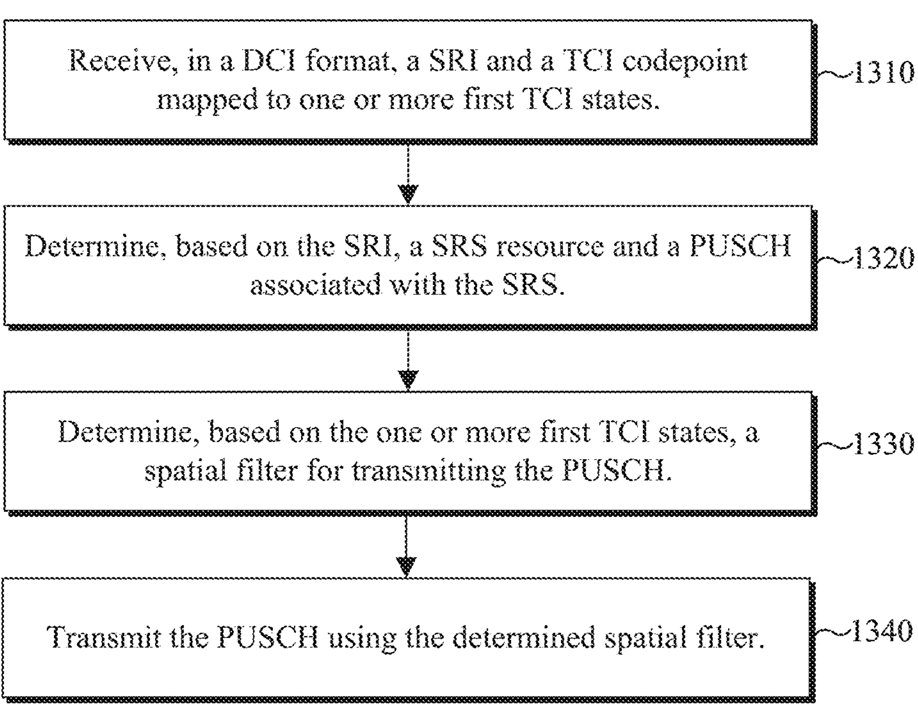
FIG. 13

INDICATING UPLINK BEAMS AND SOUNDING REFERENCE SIGNAL RESOURCES

CROSS-REFERENCE TO RELATED AND CLAIM OF PRIORITY

The present application claims priority under 35 U.S.C. § 119 (e) to U.S. Provisional Patent Application No. 63/530,194 filed on Aug. 1, 2023, which is hereby incorporated by reference in its entirety.

TECHNICAL FIELD

The present disclosure relates generally to wireless communication systems and, more specifically, the present disclosure relates to methods and apparatuses for indicating uplink (UL) beams and sounding reference signal (SRS) resources.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to indicating UL beams and SRS resources.

In one embodiment, a user equipment (UE) is provided. The UE includes a transceiver configured to receive, in a downlink control information (DCI) format, (i) a SRS resource indicator (SRI) and (ii) a transmission configuration indication (TCI) codepoint mapped to one or more first TCI states. The UE further includes a processor operably coupled with the transceiver. The processor is configured to determine, based on the SRI, a SRS resource and a physical uplink shared channel (PUSCH) associated with the SRS and determine, based on the one or more first TCI states, a spatial filter for transmitting the PUSCH. The transceiver is further configured to transmit the PUSCH using the determined spatial filter.

In another embodiment, a base station (BS) is provided. The BS includes a transceiver configured to transmit, in a DCI format, (i) a SRI and (ii) a TCI codepoint mapped to one or more first TCI states. The SRI indicates a SRS resource and a PUSCH associated with the SRS resource. The BS further includes a processor operably coupled with the transceiver. The processor is configured to determine, based on the one or more first TCI states, a spatial filter for receiving the PUSCH. The transceiver is further configured to receive the PUSCH using the determined spatial filter.

In yet another embodiment, a method performed by a UE is provided. The method includes receiving, in a DCI format, (i) a SRI and (ii) a TCI codepoint mapped to one or more first TCI states and determining, based on the SRI, a SRS resource and a PUSCH associated with the SRS resource. The method further includes determining, based on the one or more first TCI states, a spatial filter for transmitting the PUSCH; and transmitting the PUSCH using the determined spatial filter.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a flow diagram for receiving UL/downlink (DL) related downlink control information(s) (DCI(s)) according to embodiments of the present disclosure;

FIG. 8 illustrates a flow diagram for receiving UL/DL-related DCI(s) according to embodiments of the present disclosure;

FIG. 12 illustrates a table of example mapping between SRI codepoints and SRS resource sets for identifying/determining SRS resources according to embodiments of the present disclosure; and FIG. 13 illustrates an example method performed by a UE in a wireless communication system according to embodiments of the present disclosure.

DETAILED DESCRIPTION

FIGS. 1-13, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mm Wave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation;" [2] 3GPP TS 38.212 v16.1.0, "NR; Multiplexing and Channel coding;" [3] 3GPP TS 38.213 v16.1.0, "NR; Physical Layer Procedures for Control;" [4] 3GPP TS 38.214 v16.1.0, "NR; Physical Layer Procedures for Data;" [5] 3GPP TS 38.321 v16.1.0, "NR; Medium Access Control (MAC) protocol specification;" and [6] 3GPP TS 38.331 v16.1.0, "NR; Radio Resource Control (RRC) Protocol Specification."

Figure 1:
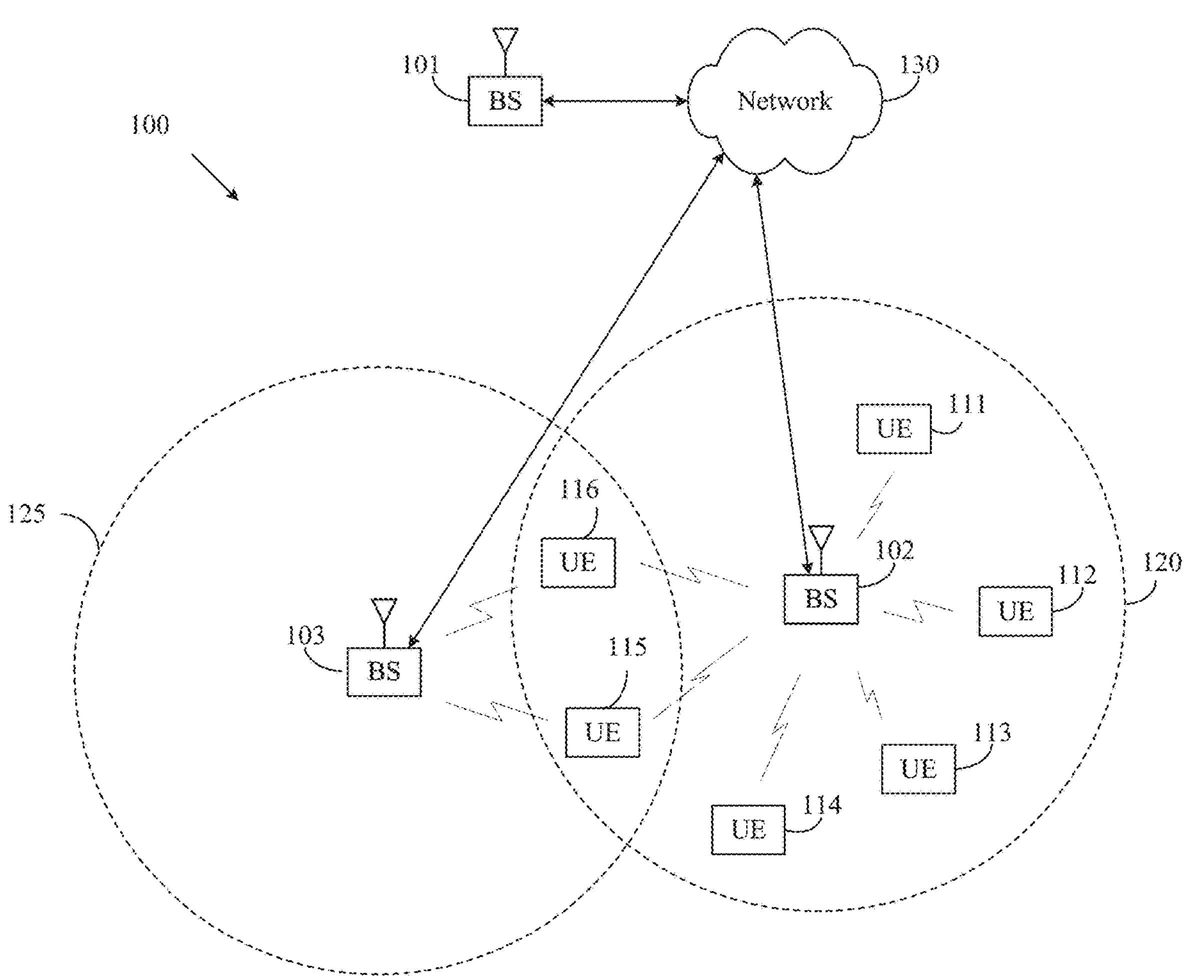
FIG. 1 illustrates an example wireless network according to embodiments of the present disclosure.
Figure 2:
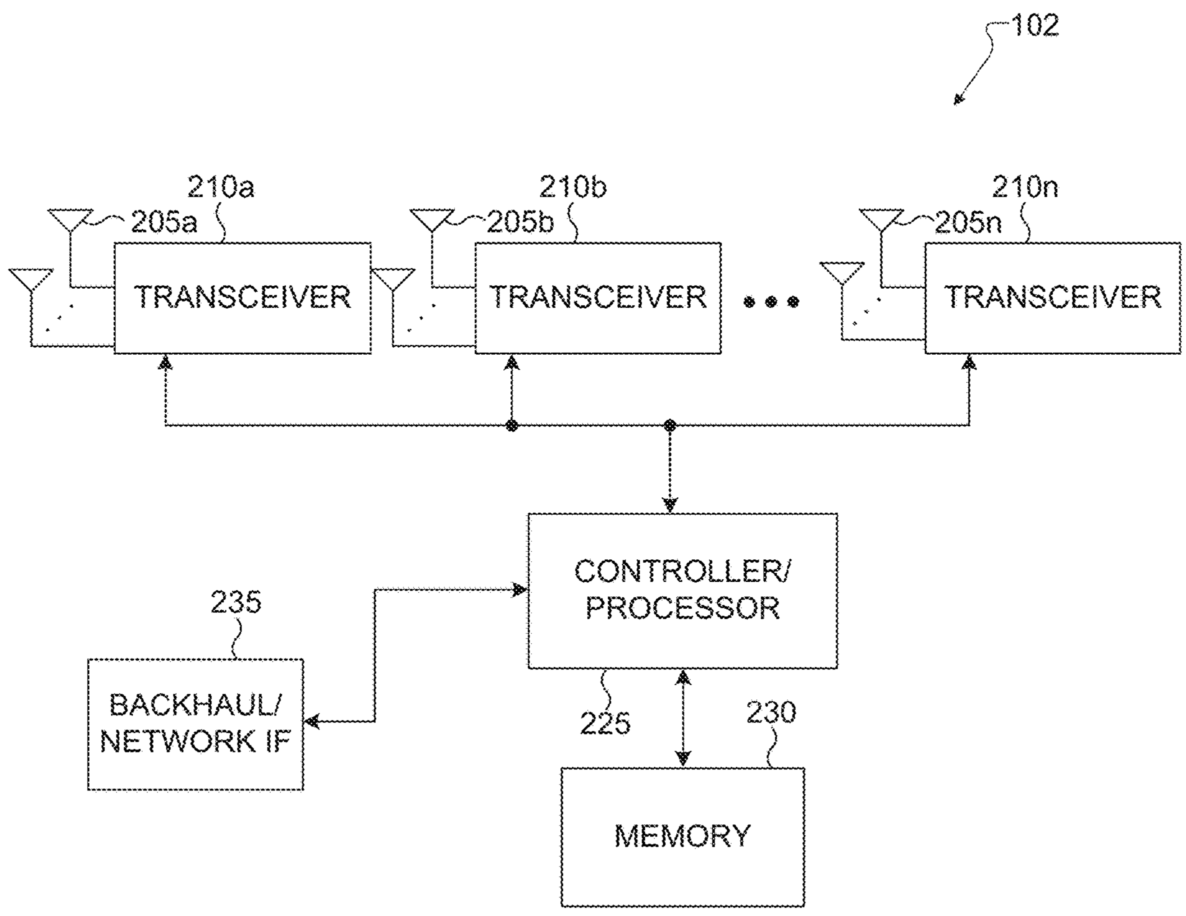
FIG. 2 illustrates an example gNodeB (gNB) according to embodiments of the present disclosure.
Figure 3:
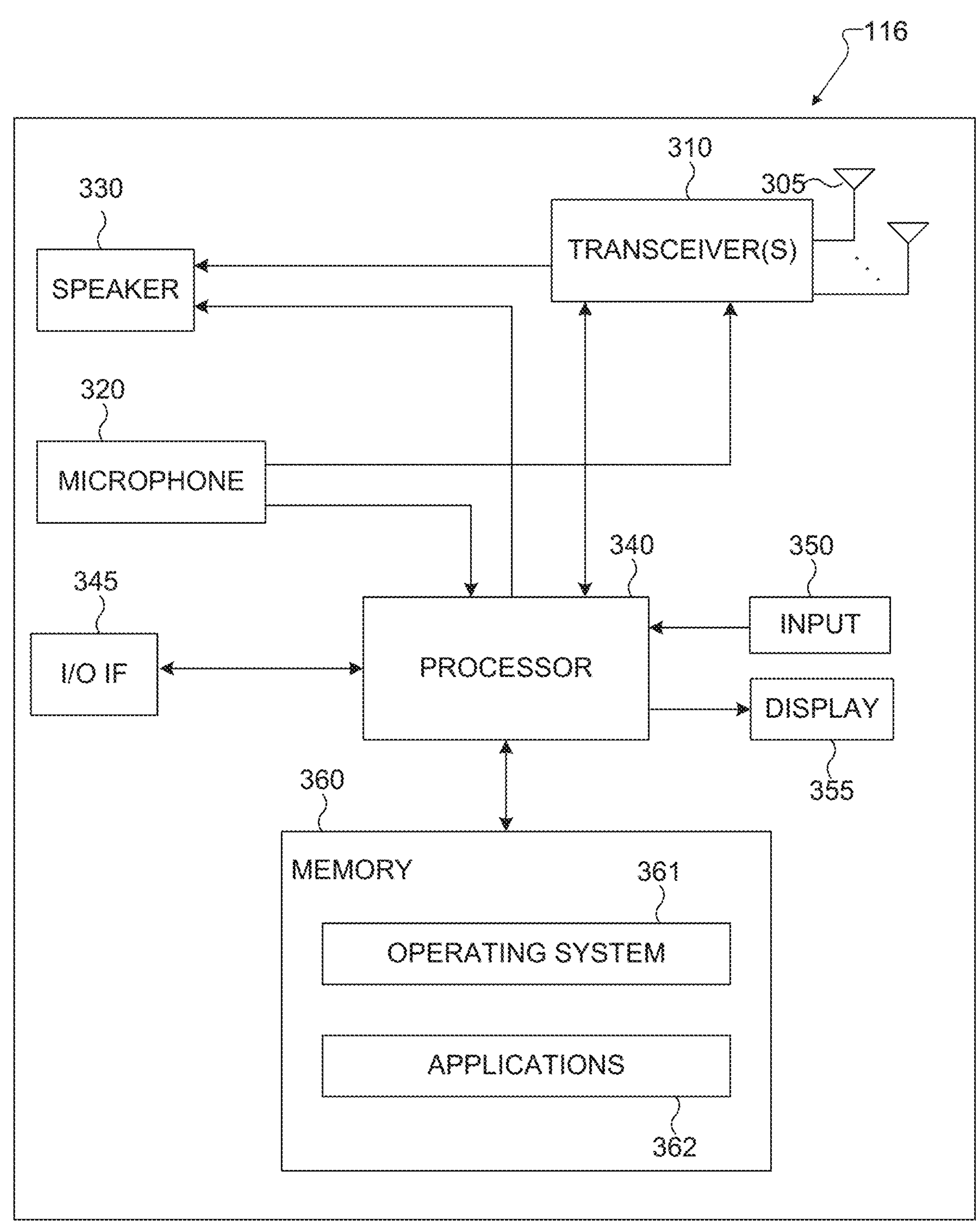
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for identifying UL beams and SRS resources. In certain embodiments, one or more of the BSs 101-103 include circuitry, programing, or a combination thereof to for indicating UL beams and SRS resources.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers **210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225**.

The controller/processor 225 is also capable of executing programs and other processes resident in the memory 230, such as supporting indicating UL beams and SRS resources. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes to identify UL beams and SRS resources as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
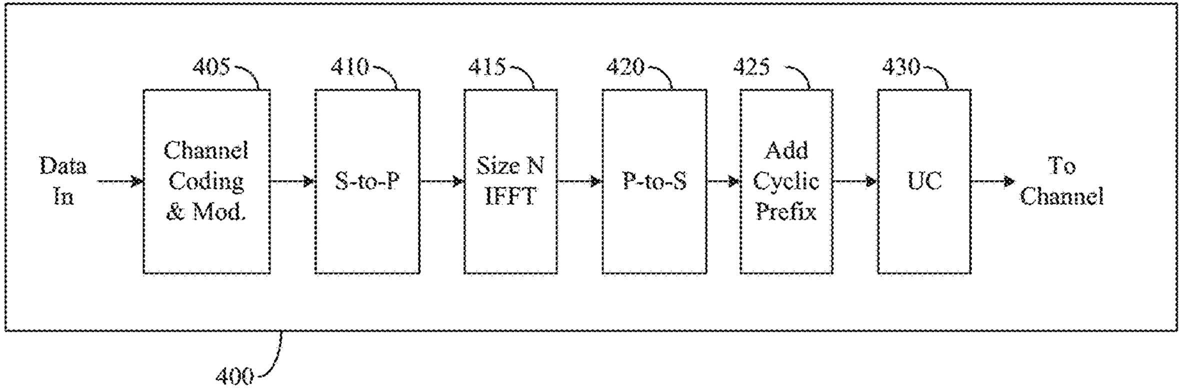
FIGS. 4A and 4B illustrates an example of a wireless transmit and receive paths according to embodiments of the present disclosure.
Figure 4B:
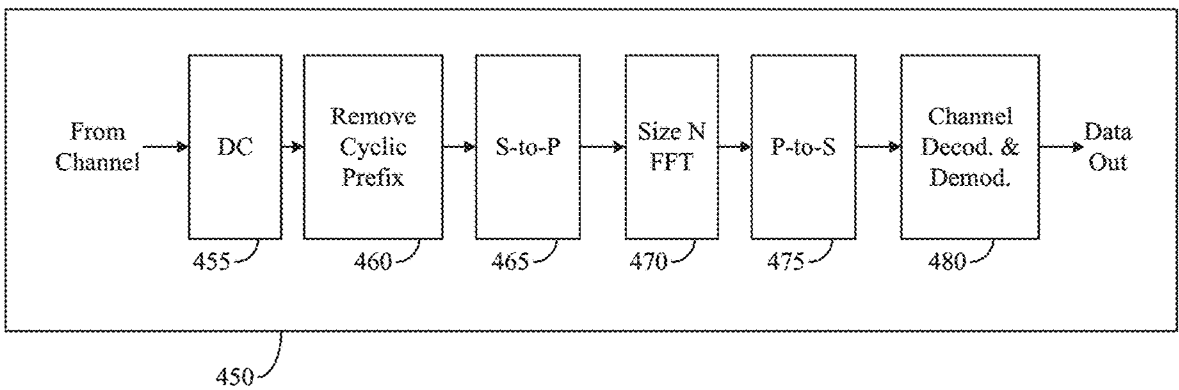

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the transmit path 400 and/or receive path 450 is configured to support indicating UL beams and SRS resources as described in embodiments of the present disclosure.

As illustrated in FIG. 4A, the transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5A:
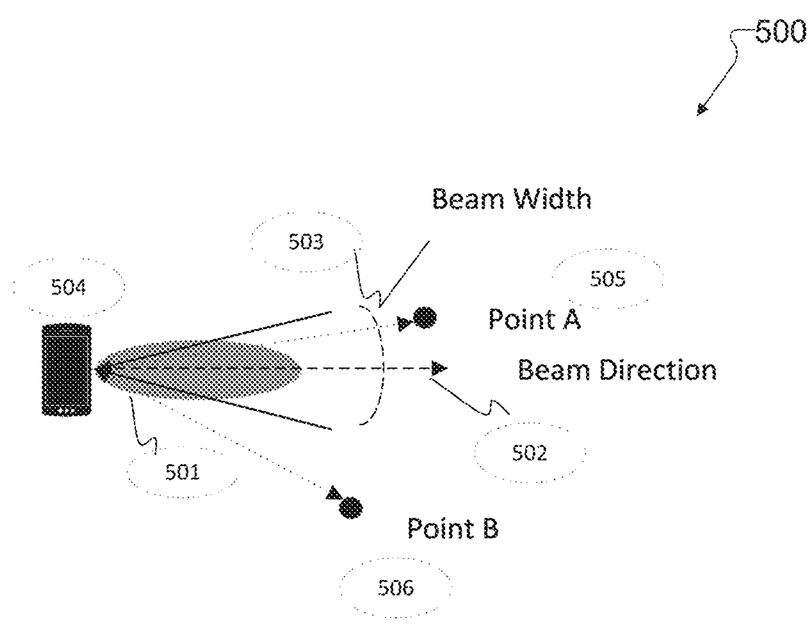
FIG. 5A illustrates an example of a wireless system according to embodiments of the present disclosure.

As illustrated in FIG. 5A, in a wireless system 500, a beam 501 for a device 504 can be characterized by a beam direction 502 and a beam width 503. For example, the device 504 (or UE 116) transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 506 cannot receive from and transmit to device 504 as Point B 506 is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

Figure 5B:
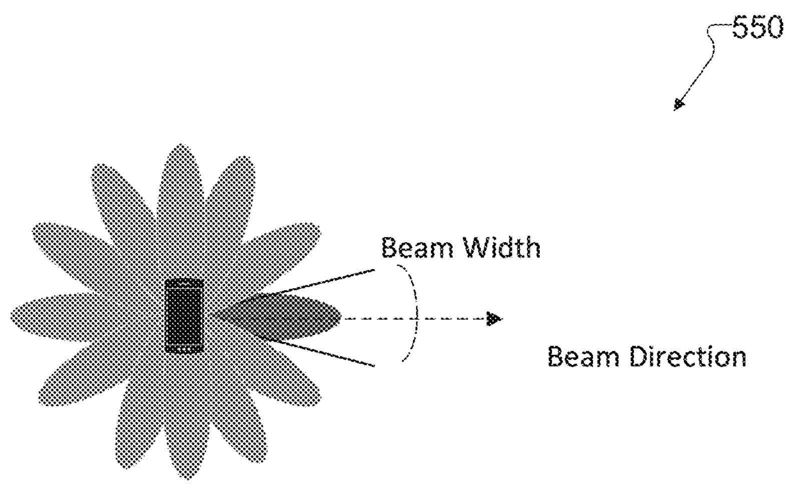
FIG. 5B illustrates an example of a multi-beam operation according to embodiments of the present disclosure.

FIG. 5B illustrates an example of a multi-beam operation 550 according to embodiments of the present disclosure. For example, the multi-beam operation 550 can be utilized by UE 116 of FIG. 3. This example is for illustration only and other embodiments can be used without departing from the scope of the present disclosure.

In a wireless system, a device can transmit and/or receive on multiple beams. This is known as "multi-beam operation". While FIG. 5B, for illustrative purposes, a beam is in 2D, it should be apparent to those skilled in the art, that a beam can be 3D, where a beam can be transmitted to or received from any direction in space.

Figure 6:
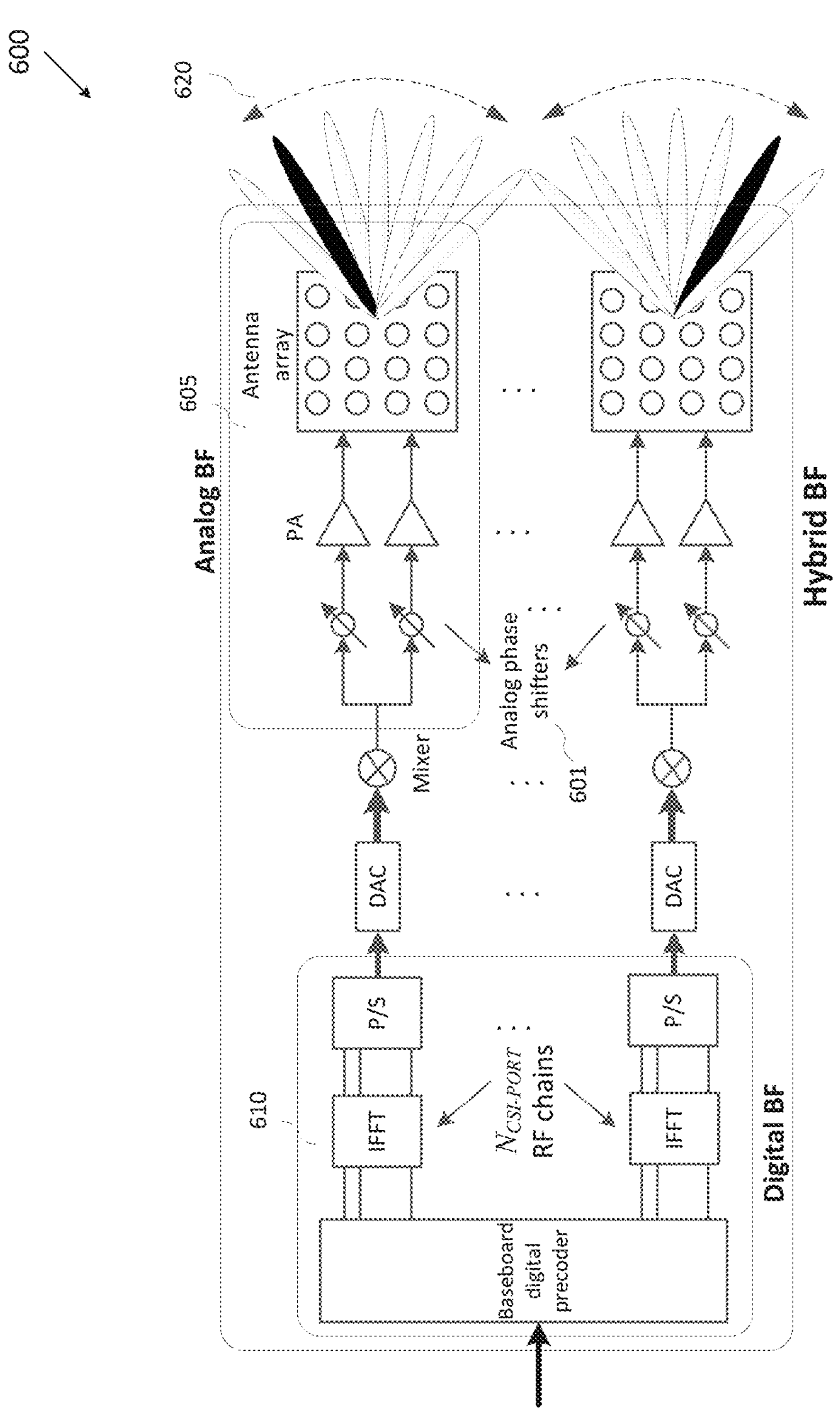
FIG. 6 illustrates an example of a transmitter structure for beamforming according to embodiments of the present disclosure.

FIG. 6 illustrates an example of a transmitter structure 600 for beamforming according to embodiments of the present disclosure. In certain embodiments, one or more of gNB 102 or UE 116 includes the transmitter structure 600. For example, one or more of antenna 205 and its associated systems or antenna 305 and its associated systems can be included in transmitter structure 600. This example is for illustration only and other embodiments can be used without departing from the scope of the present disclosure.

Accordingly, embodiments of the present disclosure recognize that Rel-14 LTE and Rel-15 NR support up to 32 channel state information reference signal (CSI-RS) antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 600 of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 6 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 600 for beamforming is for illustration only and other embodiments can be used without departing from the scope of the present disclosure.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Any of the above variation embodiments can be utilized independently or in combination with at least one other variation embodiment.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of subject matter is defined by the claims.

In various embodiments, a beam is determined by either of:

A TCI state, that establishes a quasi-colocation (QCL) relationship between a source reference signal (e.g., synchronization signal block (SSB) and/or CSI-RS) and a target reference signal; or A spatial relation information that establishes an association to a source reference signal, such as SSB or CSI-RS or sounding reference signal (SRS).

In either case, the ID of the source reference signal identifies the beam.

The TCI state and/or the spatial relation reference RS can determine a spatial Rx filter for reception of downlink channels at the UE (e.g., the UE 116), or a spatial TX filter for transmission of uplink channels from the UE.

In Rel-15 NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and physical broadcast channel (PBCH)). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In one example pertinent to Rel-15/16 NR, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, Rel-15/16 beam management becomes cumbersome and is unlikely able to keep up with more aggressive use cases which require large number of beams and fast beam switching (e.g., higher frequency bands, high mobility, and/or larger number of narrower analog beams). In addition, Rel-15/16 was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of physical downlink shared channel (PDSCH) (since RRC signaling consumes PDSCH resources).

In one example pertinent to Rel-15/16 NR, when beam correspondence is utilized, UL beam selection can be performed via measuring DL RS (CSI-RS and/or SSB) and channel quality indicator report interval (CRI) reporting accompanied with corresponding beam metrics (e.g., reference signal received power (RSRP), signal to interference and noise ratio (SINR)). That is, based on the CRI/RSRP or CRI/SINR reporting from the UE (e.g., the UE 116), the network (NW) can expect that the UE performs UL transmission on physical uplink shared channel (PUSCH) with the UL TX beam associated with one of the latest CRI reports (especially the one with the highest RSRP or/SINR). Likewise, the UE can expect that the NW knows about this UE selection. Therefore, there is no need for a separate UL beam indication (e.g., via SRI field or UL-TCI field in the respective UL grant).

In Rel-15/16 NR, when beam correspondence is not utilized, UL beam selection can be performed via the NW selecting the UL TX beam and indicating it to the UE via the UL grant (signaled via SRI field or UL-TCI field-essentially indicating the UL TCI state associated with the UL TX beam). This selection is enabled by measuring the SRS transmitted from the UE (configured by the NW).

In either case, when an event that results in the UE having to select an (alternate) UL TX beam or UL antenna panel(s) different from what the NW expects, some additional mechanisms are needed to ensure that (a) the UE has the alternate UL TX beam or antenna panel(s) available when the UE detects such an event and the next UL TX beam indication can only in a later time slot and (b) the NW is aware of the UE decision. A few examples of such an event are as follows.

In one example, such as event can happen due to the so-called Maximum Permissible Exposure (MPE) regulation, especially in North America, that restricts the UE transmission power in certain directions. That is, to prevent any excessive electromagnetic wave exposure on delicate soft tissues (e.g., brain tissues), the UE is to avoid transmitting high energy signal along some directions (e.g., toward the head). Unfortunately, such directions may correspond to the "best" UL TX beams (e.g., associated with the CRI of the highest reported RSRP/SINR, or associated with the SRS resource yielding the best measured SINR at the NW). When the "best" UL TX beams are not used for UL transmission, some loss of UL throughput (especially coverage) will occur.

In another example, such as event can happen due to hardware (HW) limitation at a UE equipped with multiple antenna panels. In response to the event, the UE selects/switches antenna panel for UL transmission.

In yet another example, such an event can happen due to beam failure. To avoid beam failure, the UE selects/switches antenna panel for UL transmission.

In yet another example, such an event can happen due to sudden change in channel conditions (e.g., due to high speed, antenna/panel blockage, etc.) which may result in beam failure, and the UE switches/changes TX beam in order to continue UL transmission without interruptions/failures or having to wait for the next UL TX beam update/indication.

Therefore, embodiments of the present disclosure recognize that there is a need for efficient designs for enabling UL TX beam or/and antenna panel selection in order to avoid outage (or beam failure), loss in UL throughput, loss in UL coverage, and issues related to HW that may happen due to the events mentioned herein. In this disclosure, several example embodiments are provided for such designs.

This disclosure is focused on UL beam and SRS resource indications for multi-TRP operation. Specifically, this disclosure provides solutions to address various beam indication and resource allocation misalignment issues for both single-DCI and multi-DCI based multi-TRP operations, under unified TCI framework, wherein the misalignment issues are mainly due to use of DL-related DCI(s) to indicate beam(s) for UL transmissions.

As specified in Rel-17, a unified TCI framework could indicate/include N≥1 DL TCI states and/or M≥1 UL TCI states, wherein the indicated TCI state could be at least one of:

- A DL TCI state and/or its corresponding/associated TCI state ID
- An UL TCI state and/or its corresponding/associated TCI state ID
- A joint DL and UL TCI state and/or its corresponding/associated TCI state ID
- Separate DL TCI state and UL TCI state and/or their corresponding/associated TCI state ID(s)

There could be various design options/channels to indicate to the UE a beam (i.e., a TCI state) for the transmission/reception of a physical downlink control channel (PDCCH) or a PDSCH. As described in the 3GPP Rel-17:

- In one example, a MAC CE could be used to indicate to the UE a beam (i.e., a TCI state and/or a TCI state ID) for the transmission/reception of a PDCCH or a PDSCH.
- In another example, a DCI could be used to indicate to the UE a beam (i.e., a TCI state and/or a TCI state ID) for the transmission/reception of a PDCCH or a PDSCH.
  - For example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.
  - For another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related downlink control information (DCI) may or may not include an UL scheduling grant.
  - Yet for another example, a custom/purpose designed DCI format could be used to indicate to the UE a beam (i.e., a TCI state and/or a TCI state ID) for the transmission/reception of a PDCCH or a PDSCH.

Rel-17 introduced the unified TCI framework, where a unified or master or main TCI state is signaled to the UE. The unified or master or main TCI state can be one of:

- In case of joint TCI state indication, wherein a same beam is used for DL and UL channels, a joint TCI state that can be used at least for UE-dedicated DL channels and UE-dedicated UL channels.
- In case of separate TCI state indication, wherein different beams are used for DL and UL channels, a DL TCI state can be used at least for UE-dedicated DL channels.
- In case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and dedicated physical uplink control channel (PUCCH) resources.

In a (single-DCI based) multi-TRP system, a UE could be indicated/provided/configured by the network (e.g., the network 130), e.g., via a beam indication MAC CE or a DCI (e.g., via one or more TCI codepoints of one or more TCI fields in the corresponding DCI 1_1/1_2 with or without DL assignment), a set of one or more (e.g., N>1) TCI states/pairs of TCI states, wherein a TCI state could be a joint DL and UL TCI state or a separate DL TCI state provided by TCI-State/DLorJointTCI-State, or a separate UL TCI state provided by TCI-State/UL-TCIState, and a pair of TCI states could include/contain a separate DL TCI state provided by TCI-State/DLorJointTCI-State or a separate UL TCI State provided by TCI-State/UL-TCIState, under the unified TCI framework.

For PDCCH reception or PDCCH candidate monitoring in a (single-DCI based) multi-TRP system, a UE could be configured/provided/indicated by the network via higher layer RRC signaling/parameter and/or MAC CE command and/or dynamic DCI based L1 signaling—e.g., in higher layer RRC signaling/parameter ControlResourceSet that configures a CORESET—a first indicator to indicate which one or more of the set of TCI states/pairs of TCI states indicated, e.g., by a TCI codepoint, in a beam indication DCI or MAC CE as specified herein in the present disclosure, to use/apply for receiving/monitoring the PDCCH(s)/PDCCH candidate(s) in the corresponding CORESET. For instance, for N=2 (i.e., a set of two TCI states/pairs of TCI states are indicated), the first indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '01' indicates that the second TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving/monitoring the PDCCH(s)/PDCCH candidate(s)—e.g., first and second PDCCH candidates—in the corresponding CORESET(s). '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for receiving/monitoring the PDCCH(s)/PDCCH candidate(s)—e.g., first and second PDCCH candidates—in the corresponding CORESET(s), wherein the first and second PDCCH candidates could be received in search space sets that are higher layer linked via SearchSpaceLinking and/or the first and second PDCCH candidates carry the same/identical DCI payload. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

For PDSCH reception in a (single-DCI based) multi-TRP system, a UE could be configured/provided/indicated by the network via higher layer RRC signaling/parameter and/or MAC CE command and/or dynamic DCI based L1 signaling—e.g., in a DL DCI (e.g., DCI format 1_0/1_1/1_2) that schedules the PDSCH—a second indicator to indicate which one or more of the set of TCI states/pairs of TCI states indicated, e.g., by a TCI codepoint, in a beam indication DCI or MAC CE as specified herein in the present disclosure, to use/apply for receiving the PDSCH(s). For instance, for N=2 (i.e., a set of two TCI states/pairs of TCI states are indicated), the second indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '01' indicates that the second TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH, wherein the first and second PDSCHs could correspond to two PDSCH transmission occasions or repetition in space, time and/or frequency. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

For PUCCH transmission in a (single-DCI based) multi-TRP system, a UE could be configured/provided/indicated by the network (e.g., the network 130) via higher layer RRC signaling/parameter and/or MAC CE command and/or dynamic DCI based L1 signaling—e.g., in higher layer RRC signaling/parameter PUCCH-Config that configures PUCCH(s)/PUCCH resource(s)—a third indicator to indicate which one or more of the set of TCI states/pairs of TCI states indicated, e.g., by a TCI codepoint, in a beam indication DCI or MAC CE as specified herein in the present disclosure, to use/apply for transmitting the PUCCH(s)/PUCCH resource(s). For instance, for N=2 (i.e., a set of two TCI states/pairs of TCI states are indicated), the third indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '01' indicates that the second TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the PUCCH(s)/PUCCH resource(s)—e.g., first PUCCH/PUCCH resource and second PUCCH/PUCCH resource. '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for transmitting the PUCCH(s)/PUCCH resource(s)—e.g., first PUCCH/PUCCH resource and second PUCCH/PUCCH resource, wherein the first and second PUCCHs/PUCCH resources could correspond to two PUCCH transmission occasions or repetitions in space, time and/or frequency. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

For PUSCH transmission in a (single-DCI based) multi-TRP system, a UE could be configured/provided/indicated by the network via higher layer RRC signaling/parameter and/or MAC CE command and/or dynamic DCI based L1 signaling—e.g., in an UL DCI (e.g., DCI format 0_0/0_1/0_2) that schedules the PUSCH-a fourth indicator to indicate which one or more of the set of TCI states/pairs of TCI states indicated, e.g., by a TCI codepoint, in a beam indication DCI or MAC CE as specified herein in the present disclosure, to use/apply for transmitting the PUSCH(s). For instance, for N=2 (i.e., a set of two TCI states/pairs of TCI states are indicated), the fourth indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '01' indicates that the second TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH (s)—e.g., first and second PUSCHs—e.g., scheduled by the UL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH, wherein the first and second PUSCHs could correspond to two PUSCH transmission occasions or repetition in space, time and/or frequency. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

In a (multi-DCI based) multi-TRP system, a UE could be indicated/provided/configured by the network, e.g., in PDCCH-Config, two values (i.e., 0 and 1) of CORESET pool index (denoted by CORESETPoolIndex), wherein each CORESET could be configured with a value of CORESETPoolIndex. Furthermore, a UE could be indicated/provided/configured by the network, e.g., via a beam indication MAC CE or a DCI (e.g., via one or more TCI codepoints of one or more TCI fields in the corresponding DCI format 1_1/1_2 with or without DL assignment) associated to a CORESET pool index value (e.g., 0 or 1), one or more TCI states/pairs of TCI states for the same (or different) CORESET pool index value, wherein a TCI state could be a joint DL and UL TCI state or a separate DL TCI state provided by TCI-State/DLorJointTCI-State or a separate UL TCI state provided by TCI-State/UL-TCIState indicated for channels/signals such as PDCCH, PDSCH, PUCCH and PUSCH associated to the same (or different) CORESET pool index value, and a pair of TCI states could include/contain a separate DL TCI state provided by TCI-State/DLorJointTCI-State or a separate UL TCI State provided by TCI-State/UL-TCIState indicated for channels/signals such as PDCCH, PDSCH, PUCCH and PUSCH associated to the same (or different) CORESET pool index value, under the unified TCI framework.

FIG. 7 illustrates a flow diagram 700 for receiving UL/DL related DCI(s) according to embodiments of the present disclosure. For example, flow diagram 700 for receiving UL/DL related DCI(s) may be followed by the UE 111 and the gNB 102 and/or network 130 in the wireless network 100 of FIG. 1. This example is for illustration only and other embodiments can be used without departing from the scope of the present disclosure.

The flow diagram begins in 710, a gNB sends to a UE UL-related DCI (fourth indicator/SRSI). In 720, the gNB sends to the UE DL-related DCI (one or more TCI states).

In one embodiment, as specified herein in the present disclosure, a UE (e.g., the UE 116) could use/apply the fourth indicator—e.g., corresponding to the SRS resource set indicator (SRSI)—indicated/provided in an UL-related DCI (e.g., DCI format 0_1/0_2) to determine/identify which (e.g., the first, the second, or both) of the one or more indicated/applied TCI states/pairs of TCI states (e.g., indicated/provided by a TCI codepoint of the TCI field in a DL-related DCI such as DCI format 1_1/1_2) to use for transmitting the PUSCH(s). The UE could use/apply the fourth indicator (or the SRSI) for the one or more indicated/applied TCI states according to one or more of the following.

In one example, the UE could use/apply the fourth indicator (or the SRSI)—e.g., indicated/provided in an UL-related DCI (e.g., DCI format 0_1/0_2), when applicable, to determine/identify at least which (e.g., the first, the second, or both) of the TCI states being used for DL/UL reception/transmission—i.e., the currently applied joint/DL/UL TCI states—to use for transmitting the PUSCH(s) according to one or more of the following conditions.

For example, the UE could use/apply the fourth indicator (or the SRSI)—e.g., indicated/provided in an UL-related DCI, when applicable, to determine/identify at least which (e.g., the first, the second, or both) of the TCI states being used for DL/UL reception/transmission—i.e., the currently applied joint/DL/UL TCI states—to use for transmitting the PUSCH(s) until the UE receives or applies a new fourth indicator (or a new SRSI), e.g., indicated/provided in a new UL-related DCI (e.g., DCI format 0_1/0_2).

For another example, the UE could use/apply the fourth indicator (or the SRSI)—e.g., indicated/provided in an UL-related DCI, when applicable, to determine/identify at least which (e.g., the first, the second, or both) of the TCI states being used for DL/UL reception/transmission—i.e., the currently applied joint/DL/UL TCI states—to use for transmitting the PUSCH(s) within to time/time window (e.g., in number of symbols/slots/etc.) after the UE has received the UL-related DCI that provides/indicates the fourth indicator/SRSI (e.g., starting from the first slot in which the UE has received/detected the UL-related DCI) or after the fourth indicator/SRSI has become applicable (e.g., starting from the first slot in which the UE has started to apply/use the fourth indicator/SRSI). The value of t0 could be: (1) fixed in system specification(s), (2) configured/indicated/provided by the network, e.g., via higher layer RRC signaling and/or MAC CE command and/or dynamic DCI based L1 signaling, and/or (3) autonomously determined/selected by the UE, and reported to the network, e.g., via/in beam/CSI report and/or UE's capability signaling.

Yet for another example, the UE could use/apply the fourth indicator (or the SRSI)—e.g., indicated/provided in an UL-related DCI, when applicable, to determine/identify at least which (e.g., the first, the second, or both) of the TCI states being used for DL/UL reception/transmission—i.e., the currently applied joint/DL/UL TCI states—to use for transmitting the PUSCH(s) when/if a timer is not expired. In one example, the timer could be associated to the UL-related DCI such that the timer starts from the first/last slot in which the UL-related DCI as specified herein in the present disclosure is received. In another example, the timer could be associated to the fourth indicator/SRSI such that the timer starts from the first/last slot in which the fourth indicator/SRSI indicated by/in the UL-related DCI as specified herein in the present disclosure has become applicable. The value(s)/setting(s) of the timer as specified herein in the present disclosure could be determined according to: (1) fixed value(s)/rule(s) specified/provided in system specification(s), (2) network's configuration(s)/indication(s), e.g., via higher layer RRC signaling and/or MAC CE command and/or dynamic DCI based L1 signaling, and/or (3) UE's autonomous determination/selection/decision, which could also be reported to the network, e.g., via/in beam/CSI report and/or UE's capability signaling.

In another example, as illustrated in FIG. 7, a UE could receive from the network an UL-related DCI providing/indicating the fourth indicator (or the SRSI), and a beam indication MAC CE/DCI providing/indicating one or more TCI states. The reception of the UL-related DCI could be earlier in time than that of the beam indication MAC CE/DCI. Furthermore, as illustrated in FIG. 7, the fourth indicator (or the SRSI) could become applicable earlier or later in time than the reception of the beam indication MAC CE/DCI and/or earlier or later in time than when the indicated one or more TCI states have become applicable. The UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s) according to one or more of the following conditions.

For example, the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s) until the UE receives or applies a new fourth indicator (or a new SRSI), e.g., indicated/provided in a new UL-related DCI (e.g., DCI format 0_1/0_2).

For another example, when/if the UL-related DCI as specified herein in the present disclosure is the most recent UL-related DCI that provides/indicates the fourth indicator (or the SRSI) prior to the reception of the beam indication MAC CE/DCI as specified herein in the present disclosure or prior to the indicated one or more TCI states have become applicable, and/or when/if the fourth indicator (or the SRSI) indicated/provided by/in the UL-related DCI as specified herein in the present disclosure is the most recent fourth indicator (or the SRSI) that has become applicable prior to or after the reception of the beam indication MAC CE/DCI as specified herein in the present disclosure or prior to or after the indicated one or more TCI states have become applicable, the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

For another example, when/if the beam indication MAC CE/DCI as specified herein in the present disclosure is received (e.g., starting from the first/last slot in which the beam indication MAC CE/DCI is received) within t1 time/time window after the UL-related DCI that provides/indicates the fourth indicator (or the SRSI) is received (e.g., starting from the first/last slot in which the UL-related DCI is received), and/or when/if the beam indication MAC CE/DCI as specified herein in the present disclosure is received (e.g., starting from the first/last slot in which the beam indication MAC CE/DCI is received) within t2 time/time window prior to or after the fourth indicator (or the SRSI) indicated in/by the UL-related DCI has become applicable (e.g., starting from the first/last slot in which the fourth indicator/SRSI has become applicable), and/or when/if the indicated one or more TCI states by/in the beam indication MAC CE/DCI have become applicable (e.g., starting from the first/last slot in which the indicated TCI state(s) has become applicable) within t3 time/time window after the UL-related DCI that provides/indicates the fourth indicator (or the SRSI) is received (e.g., starting from the first/last slot in which the UL-related DCI is received), and/or when/if the indicated one or more TCI states by/in the beam indication MAC CE/DCI have become applicable (e.g., starting from the first/last slot in which the indicated TCI state(s) has become applicable) within t4 time/time window prior to or after the fourth indicator (or the SRSI) indicated in/by the UL-related DCI has become applicable (e.g., starting from the first/last slot in which the fourth indicator/SRSI has become applicable), the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s). The value(s) of t1 and/or t2 and/or t3 and/or t4 could be: (1) fixed in system specification(s), (2) configured/indicated/provided by the network, e.g., via higher layer RRC signaling and/or MAC CE command and/or dynamic DCI based L1 signaling, and/or (3) autonomously determined/selected by the UE, and reported to the network, e.g., via/in beam/CSI report and/or UE's capability signaling.

Yet for another example, the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s) when/if a timer is not expired. In one example, the timer could be associated to the UL-related DCI such that the timer starts from the first/last slot in which the UL-related DCI as specified herein in the present disclosure is received. In another example, the timer could be associated to the fourth indicator/SRSI such that the timer starts from the first/last slot in which the fourth indicator/SRSI indicated by/in the UL-related DCI as specified herein in the present disclosure has become applicable. In yet another example, the timer could be associated to the beam indication MAC CE/DCI such that the timer starts from the first/last slot in which the beam indication MAC CE/DCI is received. In yet another example, the timer could be associated to the indicated one or more TCI states such that the timer starts from the first/last slot in which the indicated one or more TCI states by/in the beam indication MAC CE/DCI have become applicable. The value(s)/setting(s) of the timer as specified herein in the present disclosure could be determined according to: (1) fixed value(s)/rule(s) specified/provided in system specification(s), (2) network's configuration(s)/indication(s), e.g., via higher layer RRC signaling and/or MAC CE command and/or dynamic DCI based L1 signaling, and/or (3) UE's autonomous determination/selection/decision, which could also be reported to the network, e.g., via/in beam/CSI report and/or UE's capability signaling.

Yet for another example, the UE could be indicated/provided/configured by the network, e.g., via higher layer RRC signaling and/or MAC CE command and/or dynamic DCI based L1 signaling, a mapping/association relationship/rule between the UL-related DCI that indicates/provides the fourth indicator (or the SRSI) as specified herein in the present disclosure and the beam indication MAC CE/DCI that indicates/provides the one or more TCI states as specified herein in the present disclosure. In one example, the UE could be provided/indicated by the network, e.g., in the UL-related DCI (e.g., DCI format 0_1/0_2), an UL-indicator, which could correspond to a new/dedicated indicator field in the corresponding DCI format(s) and/or one or more bits of one or more of the existing DCI fields in the corresponding DCI format(s)—e.g., via/by repurposing and/or network's configuration(s)/indication(s). The UE could also be provided/indicated by the network, e.g., in the beam indication MAC CE/DCI (e.g., DCI format 1_1/1_2), a DL-indicator, which could correspond to a new/dedicated indicator field in the corresponding DCI format(s) and/or one or more bits of one or more of the existing DCI fields in the corresponding DCI format(s)—e.g., via/by repurposing and/or network's configuration(s)/indication(s). In another example, instead of/in addition to indicating/providing the UL-indicator in the UL-related DCI that provides/indicates the fourth indicator/SRSI, the UL-indicator could be indicated/provided/configured in higher layer RRC signaling(s)/parameter(s) and/or MAC CE command(s) and/or dynamic DCI based L1 signaling(s) that could be associated/corresponding to the UL-related DCI and/or the fourth indicator/SRSI indicated/provided in the UL-related DCI. Similarly, instead of/in addition to indicating/providing the DL-indicator in the beam indication MAC CE/DCI that provides/indicates the one or more TCI states, the DL-indicator could be indicated/provided/configured in higher layer RRC signaling(s)/parameter(s) and/or MAC CE command(s) and/or dynamic DCI based L1 signaling(s) that could be associated/corresponding to the beam indication MAC CE/DCI and/or the one or more TCI states indicated/provided in/by the beam indication MAC CE/DCI. When/if the UL-indicator (e.g., indicated/provided in DCI format 0_1/0_2) and the DL-indicator (e.g., indicated/provided in DCI format 1_1/1_2) are common/identical (e.g., they have the same value(s)), the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

Yet for another example, as specified herein in the present disclosure, the UE could use/apply a first TCI state/pair of TCI states (denoted by first TCI state(s)) and/or a second TCI state/pair of TCI states (denoted by second TCI state(s)) for transmitting the PUSCH(s) according to the fourth indicator/SRSI provided/indicated in the corresponding UL-related DCI. When/if the fourth indicator/SRSI as specified herein in the present disclosure indicates/provides the first TCI state(s) to use/apply and the one or more TCI states indicated/provided by/in the beam indication MAC CE/DCI are to update at least the first TCI state(s), and/or when/if the fourth indicator/SRSI as specified herein in the present disclosure indicates/provides the second TCI state(s) to use/apply and the one or more TCI states indicated/provided by/in the beam indication MAC CE/DCI are to update at least the second TCI state(s), and/or when/if the fourth indicator/SRSI as specified herein in the present disclosure indicates/provides both of the first and second TCI states to use/apply and the one or more TCI states indicated/provided by/in the beam indication MAC CE/DCI are to update both of the first and second TCI states, the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

Yet for another example, the UE could be expected to receive a new UL-related DCI that provides/indicates a new fourth indicator/SRSI according to those specified herein in the present disclosure to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s). For this design example, the UE could be expected to receive the new UL-related DCI and the beam indication MAC CE/DCI in the same slot, or within a time/time window t5 (e.g., in number of symbols/slots/etc.); the UE could also be indicated/provided/configured by the network, e.g., via higher layer RRC signaling(s)/parameter(s) and/or MAC CE command(s) and/or dynamic DCI based L1 signaling(s), that the new UL-related DCI (and therefore, the new fourth indicator/SRSI provided/indicated therein) is linked/associated to the beam indication MAC CE/DCI (and therefore, the one or more TCI states indicated therein) according to those specified herein in the present disclosure (e.g., following the design principles of the UL-indicator and the DL-indicator described herein); furthermore, the new UL-related DCI could be the most recent UL-related DCI that provides/indicates the fourth indicator (or the SRSI) after the reception of the beam indication MAC CE/DCI as specified herein in the present disclosure or prior to/after the indicated one or more TCI states have become applicable, and/or the new fourth indicator (or the new SRSI) indicated/provided by/in the new UL-related DCI could be the most recent fourth indicator (or the SRSI) that has become applicable after the reception of the beam indication MAC CE/DCI as specified herein in the present disclosure or prior to/after the indicated one or more TCI states have become applicable. When/if the UE does not receive such new UL-related DCI(s)—e.g., following those specified herein in the present disclosure and/or satisfying one or more of the conditions described herein, and/or when/if the UE receives such new UL-related DCI(s)—e.g., following those specified herein in the present disclosure and/or satisfying one or more of the conditions described herein—but the new fourth indicator/SRSI provided/indicated therein has not become applicable, the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s). The value(s) of t5 could be: (1) fixed in system specification(s), (2) configured/indicated/provided by the network, e.g., via higher layer RRC signaling and/or MAC CE command and/or dynamic DCI based L1 signaling, and/or (3) autonomously determined/selected by the UE, and reported to the network, e.g., via/in beam/CSI report and/or UE's capability signaling.

Yet for another example, when/if the UL-related DCI that provides/indicates the fourth indicator/SRSI and the beam indication MAC CE/DCI that provides/indicates the one or more TCI states are received in the same slot, and/or when/if the UL-related DCI that provides/indicates the fourth indicator/SRSI is received in the same slot in which the indicated one or more TCI states by/in the beam indication MAC CE/DCI have become applicable, and/or when/if the fourth indicator/SRSI indicated by/in the UL-related DCI as specified herein in the present disclosure and the indicated one or more TCI states by/in the beam indication MAC CE/DCI become applicable in the same slot, and/or when/if the fourth indicator/SRSI indicated by/in the UL-related DCI as specified herein in the present disclosure has become applicable in the same slot in which the beam indication MAC CE/DCI that provides/indicates the one or more TCI states is received, the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

FIG. 8 illustrates a flow diagram 800 for receiving UL/DL-related DCI(s) according to embodiments of the present disclosure. For example, flow diagram 800 for receiving UL/DL-related DCI(s) may be followed by the UE 112 and the gNB 102 and/or network 130 in the wireless network 100 of FIG. 1. This example is for illustration only and other embodiments can be used without departing from the scope of the present disclosure.

In yet another example, as illustrated in FIG. 8, a UE could receive from the network an UL-related DCI providing/indicating the fourth indicator (or the SRSI), and a beam indication MAC CE/DCI providing/indicating one or more TCI states. The reception of the UL-related DCI could be later in time than that of the beam indication MAC CE/DCI and/or earlier or later in time than when the indicated one or more TCI states have become applicable. Furthermore, as illustrated in FIG. 8, the fourth indicator (or the SRSI) could become applicable later in time than the reception of the beam indication MAC CE/DCI and/or earlier or later in time than when the indicated one or more TCI states have become applicable. The UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s) according to one or more of the following conditions.

For example, when/if the fourth indicator (or the SRSI)—e.g., indicated/provided in the UL-related DCI (e.g., DCI format 0_1/0_2) has become applicable, the UE could use/apply the fourth indicator/SRSI to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

For another example, when/if the UL-related DCI as specified herein in the present disclosure is the most recent UL-related DCI that provides/indicates the fourth indicator (or the SRSI) after the reception of the beam indication MAC CE/DCI as specified herein in the present disclosure or prior to or after the indicated one or more TCI states have become applicable, and/or when/if the fourth indicator (or the SRSI) indicated/provided by/in the UL-related DCI as specified herein in the present disclosure is the most recent fourth indicator (or the SRSI) that has become applicable after the reception of the beam indication MAC CE/DCI as specified herein in the present disclosure or prior to or after the indicated one or more TCI states have become applicable, the UE (e.g., the UE 116) could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

For another example, when/if the UL-related DCI that provides/indicates the fourth indicator (or the SRSI) is received (e.g., starting from the first/last slot in which the UL-related DCI is received) within t1' time/time window after the beam indication MAC CE/DCI as specified herein in the present disclosure is received (e.g., starting from the first/last slot in which the beam indication MAC CE/DCI is received), and/or when/if the UL-related DCI that provides/indicates the fourth indicator (or the SRSI) is received (e.g., starting from the first/last slot in which the UL-related DCI is received) within t2' time/time window prior to or after the indicated one or more TCI states by/in the beam indication MAC CE/DCI have become applicable (e.g., starting from the first/last slot in which the indicated TCI state(s) has become applicable), and/or when/if the fourth indicator (or the SRSI) indicated in/by the UL-related DCI has become applicable (e.g., starting from the first/last slot in which the fourth indicator/SRSI has become applicable) within t3' time/time window after the beam indication MAC CE/DCI as specified herein in the present disclosure is received (e.g., starting from the first/last slot in which the beam indication MAC CE/DCI is received), and/or when/if when/if the fourth indicator (or the SRSI) indicated in/by the UL-related DCI has become applicable (e.g., starting from the first/last slot in which the fourth indicator/SRSI has become applicable) within t4' time/time window prior to or after the indicated one or more TCI states by/in the beam indication MAC CE/DCI have become applicable (e.g., starting from the first/last slot in which the indicated TCI state(s) has become applicable), the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s). The value(s) of t1' and/or t2' and/or t3' and/or t4' could be: (1) fixed in system specification(s), (2) configured/indicated/provided by the network, e.g., via higher layer RRC signaling and/or MAC CE command and/or dynamic DCI based L1 signaling, and/or (3) autonomously determined/selected by the UE, and reported to the network, e.g., via/in beam/CSI report and/or UE's capability signaling.

Yet for another example, the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s) when/if a timer is not expired. In one example, the timer could be associated to the UL-related DCI such that the timer starts from the first/last slot in which the UL-related DCI as specified herein in the present disclosure is received. In another example, the timer could be associated to the fourth indicator/SRSI such that the timer starts from the first/last slot in which the fourth indicator/SRSI indicated by/in the UL-related DCI as specified herein in the present disclosure has become applicable. In yet another example, the timer could be associated to the beam indication MAC CE/DCI such that the timer starts from the first/last slot in which the beam indication MAC CE/DCI is received. In yet another example, the timer could be associated to the indicated one or more TCI states such that the timer starts from the first/last slot in which the indicated one or more TCI states by/in the beam indication MAC CE/DCI have become applicable. The value(s)/setting(s) of the timer as specified herein in the present disclosure could be determined according to: (1) fixed value(s)/rule(s) specified/provided in system specification(s), (2) network's configuration(s)/indication(s), e.g., via higher layer RRC signaling and/or MAC CE command and/or dynamic DCI based L1 signaling, and/or (3) UE's autonomous determination/selection/decision, which could also be reported to the network, e.g., via/in beam/CSI report and/or UE's capability signaling.

Yet for another example, the UE could be indicated/provided/configured by the network (e.g., the network 130), e.g., via higher layer RRC signaling and/or MAC CE command and/or dynamic DCI based L1 signaling, a mapping/association relationship/rule between the UL-related DCI that indicates/provides the fourth indicator (or the SRSI) as specified herein in the present disclosure and the beam indication MAC CE/DCI that indicates/provides the one or more TCI states as specified herein in the present disclosure. In one example, the UE could be provided/indicated by the network, e.g., in the UL-related DCI (e.g., DCI format 0_1/0_2), an UL-indicator, which could correspond to a new/dedicated indicator field in the corresponding DCI format(s) and/or one or more bits of one or more of the existing DCI fields in the corresponding DCI format(s)—e.g., via/by repurposing and/or network's configuration(s)/indication(s). The UE could also be provided/indicated by the network, e.g., in the beam indication MAC CE/DCI (e.g., DCI format 1_1/1_2), a DL-indicator, which could correspond to a new/dedicated indicator field in the corresponding DCI format(s) and/or one or more bits of one or more of the existing DCI fields in the corresponding DCI format(s)—e.g., via/by repurposing and/or network's configuration(s)/indication(s). In another example, instead of/in addition to indicating/providing the UL-indicator in the UL-related DCI that provides/indicates the fourth indicator/SRSI, the UL-indicator could be indicated/provided/configured in higher layer RRC signaling(s)/parameter(s) and/or MAC CE command(s) and/or dynamic DCI based L1 signaling(s) that could be associated/corresponding to the UL-related DCI and/or the fourth indicator/SRSI indicated/provided in the UL-related DCI. Similarly, instead of/in addition to indicating/providing the DL-indicator in the beam indication MAC CE/DCI that provides/indicates the one or more TCI states, the DL-indicator could be indicated/provided/configured in higher layer RRC signaling(s)/parameter(s) and/or MAC CE command(s) and/or dynamic DCI based L1 signaling(s) that could be associated/corresponding to the beam indication MAC CE/DCI and/or the one or more TCI states indicated/provided in/by the beam indication MAC CE/DCI. When/if the UL-indicator (e.g., indicated/provided in DCI format 0_1/0_2) and the DL-indicator (e.g., indicated/provided in DCI format 1_1/1_2) are common/identical (e.g., they have the same value(s)), the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

Yet for another example, when/if the UL-related DCI that provides/indicates the fourth indicator/SRSI and the beam indication MAC CE/DCI that provides/indicates the one or more TCI states are received in the same slot, and/or when/if the UL-related DCI that provides/indicates the fourth indicator/SRSI is received in the same slot in which the indicated one or more TCI states by/in the beam indication MAC CE/DCI have become applicable, and/or when/if the fourth indicator/SRSI indicated by/in the UL-related DCI as specified herein in the present disclosure and the indicated one or more TCI states by/in the beam indication MAC CE/DCI become applicable in the same slot, and/or when/if the fourth indicator/SRSI indicated by/in the UL-related DCI as specified herein in the present disclosure has become applicable in the same slot in which the beam indication MAC CE/DCI that provides/indicates the one or more TCI states is received, the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

In yet another example, a UE could receive from the network an UL-related DCI providing/indicating the fourth indicator (or the SRSI) and a beam indication MAC CE/DCI providing/indicating one or more TCI states. When/if the UL-related DCI that provides/indicates the fourth indicator/SRSI and the beam indication MAC CE/DCI that provides/indicates the one or more TCI states are received in the same slot, and/or when/if the UL-related DCI that provides/indicates the fourth indicator/SRSI is received in the same slot in which the indicated one or more TCI states by/in the beam indication MAC CE/DCI have become applicable, and/or when/if the fourth indicator/SRSI indicated by/in the UL-related DCI as specified herein in the present disclosure and the indicated one or more TCI states by/in the beam indication MAC CE/DCI become applicable in the same slot, and/or when/if the fourth indicator/SRSI indicated by/in the UL-related DCI as specified herein in the present disclosure has become applicable in the same slot in which the beam indication MAC CE/DCI that provides/indicates the one or more TCI states is received, the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

In yet another example, a UE could receive from the network a beam indication MAC CE/DCI providing/indicating one or more TCI states. The UE could be provided/indicated by the network, e.g., in the beam indication MAC CE/DCI (e.g., DCI format 1_1/1_2 with or without DL assignment) that provides/indicates the one or more TCI states, the fourth indicator/SRSI; when indicated/provided in the beam indication DCI, the fourth indicator/SRSI as specified herein in the present disclosure could correspond to a new/dedicated indicator field in the corresponding DCI format(s) and/or one or more bits of one or more of the existing DCI fields in the corresponding DCI format(s)—e.g., via/by repurposing and/or network's configuration(s)/indication(s). Furthermore, the fourth indicator/SRSI as specified/defined herein in the present disclosure could be a different/separate field from the TCI field in the corresponding DL DCI format(s)—e.g., DCI format 1_1/1_2; alternatively, the fourth indicator/SRSI as specified/defined herein in the present disclosure could be a joint/same field as the TCI field in the corresponding DL DCI format(s)—e.g., DCI format 1_1/1_2. For this design example, the UE could use/apply the fourth indicator (or the SRSI)—e.g., indicated/provided in the beam indication MAC CE/DCI (e.g., DCI format 1_1/1_2 with or without DL assignment), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

In yet another example, a UE could receive from the network a beam indication MAC CE/DCI providing/indicating one or more TCI states. The UE could be provided/indicated by the network, e.g., in the beam indication MAC CE/DCI (e.g., DCI format 1_1/1_2 with or without DL assignment) that provides/indicates the one or more TCI states, the fourth indicator/SRSI; when indicated/provided in the beam indication DCI, the fourth indicator/SRSI as specified herein in the present disclosure could correspond to a new/dedicated indicator field in the corresponding DCI format(s) and/or one or more bits of one or more of the existing DCI fields in the corresponding DCI format(s)—e.g., via/by repurposing and/or network's configuration(s)/indication(s). For this design example, the UE could use/apply the fourth indicator (or the SRSI)—e.g., indicated/provided in the beam indication MAC CE/DCI (e.g., DCI format 1_1/1_2 with or without DL assignment), when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s).

In yet another example, a UE could receive from the network a beam indication DCI providing/indicating one or more TCI states. The UE could also receive from the network a (unified) TCI state(s) activation/deactivation MAC CE providing/indicating/activating one or more TCI states/sets of TCI states with each TCI state/set of TCI states provided/indicated/activated therein map to a TCI codepoint of the TCI field in the beam indication DCI. For this design example, each TCI state/set of TCI states provided/indicated/activated in the (unified) TCI state(s) activation/deactivation MAC CE—used to map to a TCI codepoint of the TCI field in the beam indication DCI—could be associated with/to a value of the fourth indicator/SRSI, wherein the value(s) of the fourth indicator/SRSI could also be indicated/provided in the same (unified) TCI state(s) activation/deactivation MAC CE command (e.g., via one or more new fields or via/by repurposing one or more existing fields in the MAC CE based on network's configuration(s)/indication(s)). Hence, when/if the UE is provided/indicated by the network, e.g., via a TCI codepoint of the TCI field in the beam indication DCI, a TCI state/set of TCI states, the UE could also identify/determine the value of the fourth indicator/SRSI associated/corresponding to the indicated TCI state(s) as specified herein in the present disclosure. The UE could then use/apply the identified/determined fourth indicator (or the SRSI)—e.g., indicated/provided in the (unified) TCI state(s) activation/deactivation MAC CE command associated/corresponding to the indicated TCI state(s) in the beam indication DCI, when applicable, to determine/identify at least which (e.g., the first, the second, or both) of the applied joint/DL/UL TCI states—i.e., after the indicated one or more TCI states by/in the beam indication DCI have become applicable—to use for transmitting the PUSCH(s).

In yet another example, a UE could receive from the network a beam indication MAC CE/DCI providing/indicating one or more TCI states. The UE could also receive from the network, e.g., via higher layer RRC signaling(s)/parameter(s) and/or MAC CE command(s) and/or dynamic DCI based L1 signaling(s), a list/set/pool of TCI states each provided by a TCI-State. For this design example, the UE could be indicated/provided/configured by the network, e.g., via higher layer RRC signaling(s)/parameter(s) and/or MAC CE command(s) and/or dynamic DCI based L1 signaling(s), association/mapping relationship(s)/rule(s) between one or more of the configured TCI states and one or more values of the fourth indicator/SRSI defined/specified herein in the present disclosure.

For example, the UE could be indicated/provided/configured by the network, e.g., via higher layer RRC signaling(s)/parameter(s) and/or MAC CE command(s) and/or dynamic DCI based L1 signaling(s), one or more groups of TCI states each comprising one or more TCI states (each provided by TCI-State) from the list/set/pool of configured TCI states. For this design example, each of the groups of TCI states could be associated with/to a value of the fourth indicator/SRSI as specified/defined herein in the present disclosure. For instance, higher layer parameter(s)/signaling(s) that configures/provides/indicates a group of TCI states could also provide/indicate/configure a value of the fourth indicator/SRSI; for this case, the TCI states/TCI state IDs provided/configured/indicated therein (i.e., in the group of TCI states/TCI state IDs) could be associated with/to the value of the fourth indicator/SRSI indicated/provided/configured therein.

For another example, the UE could be indicated/provided/configured by the network, e.g., via higher layer RRC signaling(s)/parameter(s) and/or MAC CE command(s) and/or dynamic DCI based L1 signaling(s), one or more groups of TCI states each comprising one or more TCI states (each provided by TCI-State) from the list/set/pool of configured TCI states. For this design example, each of the groups of TCI states could be associated with/to a value of the fourth indicator/SRSI as specified/defined herein in the present disclosure according to fixed rule(s)/relation(s), which is known to the UE and the network a priori. For instance, a/the first group of TCI states or the group of TCI states with the lowest/highest TCI state group ID/index (and therefore, the TCI states/TCI state IDs configured/provided/indicated therein) could be associated to/with value '00' of the fourth indicator/SRSI as specified/defined herein in the present disclosure, a/the second group of TCI states or the group of TCI states with the second lowest/highest TCI state group ID/index (and therefore, the TCI states/TCI state IDs configured/provided/indicated therein) could be associated to/with value '01' of the fourth indicator/SRSI as specified/defined herein in the present disclosure, a/the third group of TCI states or the group of TCI states with the third lowest/highest TCI state group ID/index (and therefore, the TCI states/TCI state IDs configured/provided/indicated therein) could be associated to/with value '10' or '11' of the fourth indicator/SRSI as specified/defined herein in the present disclosure, and so on. Optionally, the higher layer RRC parameter(s)/signaling(s) that provides/configures the list/set/pool of TCI states (and therefore, the one or more groups of TCI states) could also provide/configure/indicate/comprise/contain a list/set/pool of the fourth indicator/SRSI values; for this case, a/the first group of TCI states or the group of TCI states with the lowest/highest TCI state group ID/index (and therefore, the TCI states/TCI state IDs configured/provided/indicated therein) could be associated to/with a/the first value or the lowest value of the fourth indicator/SRSI in the list/set/pool of the fourth indicators/SRSIs, a/the second group of TCI states or the group of TCI states with the second lowest/highest TCI state group ID/index (and therefore, the TCI states/TCI state IDs configured/provided/indicated therein) could be associated to/with a/the second value or the second lowest value of the fourth indicator/SRSI in the list/set/pool of the fourth indicators/SRSIs, a/the third group of TCI states or the group of TCI states with the third lowest/highest TCI state group ID/index (and therefore, the TCI states/TCI state IDs configured/provided/indicated therein) could be associated to/with a/the third value or the third lowest value of the fourth indicator/SRSI in the list/set/pool of the fourth indicators/SRSIs, and so on. Alternatively, higher layer RRC parameter(s)/signaling(s) that provides/configures a group of TCI states could indicate/provide/configure/comprise/include/contain one or more values of the fourth indicator/SRSI as specified herein in the present disclosure; for this case, the TCI states/TCI state IDs configured/provided/indicated in a group of TCI states/TCI state IDs could be associated/corresponding to one or more values of the fourth indicator/SRSI when/if the one or more values of the fourth indicator/SRSI are also provided/indicated/configured in the same higher layer parameter(s) that configures the group of TCI states/TCI state IDs.

Figure 9:
FIG. 9 illustrates a table of example mapping between values of the fourth indicator/SRSI and TCI states according to embodiments of the present disclosure.

FIG. 9 illustrates a table 900 of example mapping between values of the fourth indicator/SRSI and configured TCI states according to embodiments of the present disclosure. For example, table 900 of example mapping between values of the fourth indicator/SRSI and configured TCI states may be referenced by any of the UEs 111-116 of FIG. 1, such as the UE 116 of FIG. 3. This example is for illustration only and other embodiments can be used without departing from the scope of the present disclosure.

Yet for another example, the UE could be indicated/provided/configured by the network, e.g., via higher layer RRC signaling(s)/parameter(s) and/or MAC CE command(s) and/or dynamic DCI based L1 signaling(s), a linkage (e.g., via a look-up table presented in FIG. 9) between one or more of the configured TCI states and one or more values of the fourth indicator/SRSI defined/specified herein in the present disclosure. As illustrated in FIG. 9, a configured TCI state/TCI state ID is one-to-one linked/mapped to a value of the fourth indicator/SRSI; hence, when a configured TCI state/TCI state ID is indicated to the UE (e.g., via the beam indication MAC CE/DCI), the UE could identify/determine, based on/according to the linkage (e.g., the look-up table shown in FIG. 9), the value of the fourth indicator/SRSI that is linked/mapped to the indicated TCI state/TCI state ID.

Yet for another example, the higher layer parameter TCI-State (or other higher layer parameters that are associated/linked to a TCI-State) could provide/indicate/configure a value of the fourth indicator/SRSI as specified/defined herein in the present disclosure. A snippet of the higher layer parameter TCI-State is provided herein in the present disclosure, which contains/provides/indicates/comprises/configures a value of the fourth indicator/SRSI.

```
TCI-State ::=                SEQUENCE {
  tci-StateId                  TCI-StateId,
  qcl-Type1                      QCL-Info,
  qcl-Type2                      QCL-Info          OPTIONAL, -- Need R
    ...,
  srs-resourceSet-indicator      ENUMERATED
                                 {00, 01, 10, 11}
OPTIONAL,
    ...
}
```

Hence, when/if the UE is provided/indicated by the network, e.g., via/by a beam indication MAC CE and/or via a TCI codepoint of the TCI field in the beam indication DCI, one or more TCI states, the UE could identify/determine the value(s) of the fourth indicator/SRSI associated/corresponding to the indicated TCI state(s) according to/based on their (higher layer) association(s)/mapping(s) as specified herein in the present disclosure.

For example, when only one TCI state is indicated, the UE could identify/determine the value of the fourth indicator/SRSI associated/corresponding to the indicated TCI state according to/based on their (higher layer) association/mapping as specified herein in the present disclosure. For instance, the value of the fourth indicator/SRSI could be provided/indicated/configured in the higher layer parameter TCI-State that provides/configures the indicated TCI state. Or the value of the fourth indicator/SRSI could be associated/corresponding to a group of TCI states that comprise/contain/include/provide/configure/indicate the indicated TCI state. For this design example, the UE could use/apply the identified/determined fourth indicator/SRSI (higher layer) associated/corresponding to the indicated TCI state in the beam indication MAC CE/DCI, when applicable, to determine/identify at least which (e.g., the first, the second, or both) of the applied joint/DL/UL TCI states—i.e., after the indicated TCI state by/in the beam indication MAC CE/DCI have become applicable—to use for transmitting the PUSCH(s).

For another example, when more than one TCI states are indicated, the UE could identify/determine one or more values of the fourth indicator/SRSI associated/corresponding to the indicated TCI states according to/based on their (higher layer) association(s)/mapping(s) as specified herein in the present disclosure. The UE could further determine/identify a primary value of the fourth indicator/SRSI from the identified/determined one or more values of the fourth indicator/SRSI. In one example, the UE could identify/determine only one value of the fourth indicator/SRSI associated/corresponding to an indicated TCI state according to/based on their (higher layer) association/mapping as specified herein in the present disclosure (i.e., the other indicated TCI state(s) is not associated/corresponding to any value(s) of the fourth indicator/SRSI); for this case, the primary value of the fourth indicator/SRSI could correspond to the one value of the fourth indicator/SRSI. In another example, the UE could identify/determine more than one values of the fourth indicator/SRSI each associated/corresponding to an indicated TCI state according to/based on their (higher layer) association(s)/association(s) as specified herein in the present disclosure; for this case, the UE could identify/determine the primary value of the fourth indicator/SRSI—from the identified/determined more than one values of the fourth indicator/SRSI-according to/based on (i) fixed rule(s) in system specification(s), (ii) network's configuration/indication, e.g., via higher layer RRC signaling(s)/parameter(s) and/or MAC CE command(s) and/or dynamic DCI based L1 signaling(s), and/or (iii) UE's autonomous decision/selection, which could also be reported to the network, e.g., in part of a beam/CSI report and/or UE's capability signaling; for example, the primary value of the fourth indicator/SRSI could correspond to the (value of) fourth indicator/SRSI (higher layer) associated/corresponding to a/the first TCI state/pair of TCI states of the indicated TCI codepoint/set of TCI states, a/the second TCI state/pair of TCI states of the indicated TCI codepoint/set of TCI states, and/or so on; for another example, the primary value of the fourth indicator/SRSI could correspond to the (value of) fourth indicator/SRSI (higher layer) associated/corresponding the TCI state/pair of TCI states—of the indicated TCI codepoint/set of TCI states—with the lowest/highest TCI state ID(s); yet for another example, the UE could be expected that the more than one values of the fourth indicator/SRSI associated/corresponding to one or more of the indicated TCI states according to/based on their (higher layer) association(s)/association(s) as specified herein in the present disclosure are common/identical/same; for this case, the primary value of the fourth indicator/SRSI could correspond to the (value of) fourth indicator/SRSI (higher layer) associated/corresponding to any of the indicated TCI states. For this design example, the UE could use/apply the identified/determined primary value of the fourth indicator/SRSI (higher layer) associated/corresponding to an indicated TCI state in the beam indication MAC CE/DCI, when applicable, to determine/identify at least which (e.g., the first, the second, or both) of the applied joint/DL/UL TCI states—i.e., after the indicated TCI state by/in the beam indication MAC CE/DCI have become applicable—to use for transmitting the PUSCH(s).

In yet another example, a UE could receive from the network a beam indication MAC CE/DCI providing/indicating one or more TCI states. The UE could use/apply the second indicator (denoted by TCI selection field)—e.g., indicated/provided in the beam indication DCI (e.g., DCI format 1_1/1_2 with or without DL assignment) for PDSCH reception(s) as specified herein in the present disclosure, when applicable/configured/present, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s). For instance, when/if the second indicator (or the TCI selection field) indicated/provided in the beam indication DCI that provides/indicates the one or more TCI states is set to '00', the UE could use the first applied joint/DL/UL TCI state(s)—i.e., after the indicated one or more TCI states by/in the beam indication MAC CE/DCI have become applicable—for transmitting the PUSCH(s)—e.g., scheduled by a UL-related DCI/PDCCH. When/if the second indicator (or the TCI selection field) indicated/provided in the beam indication DCI that provides/indicates the one or more TCI states is set to '01', the UE could use the second applied joint/DL/UL TCI state(s)—i.e., after the indicated one or more TCI states by/in the beam indication MAC CE/DCI have become applicable—for transmitting the PUSCH(s)—e.g., scheduled by a UL-related DCI/PDCCH. When/if the second indicator (or the TCI selection field) indicated/provided in the beam indication DCI that provides/indicates the one or more TCI states is set to '10', the UE could respectively use the first and second applied joint/DL/UL TCI states—i.e., after the indicated one or more TCI states by/in the beam indication MAC CE/DCI have become applicable—for transmitting the PUSCH(s)—e.g., the first and second PUSCHs scheduled by a UL-related DCI/PDCCH. When/if the second indicator (or the TCI selection field) indicated/provided in the beam indication DCI that provides/indicates the one or more TCI states is set to '11', the UE could respectively use the second and first applied joint/DL/UL TCI states—i.e., after the indicated one or more TCI states by/in the beam indication MAC CE/DCI have become applicable—for transmitting the PUSCH(s)—e.g., the first and second PUSCHs scheduled by a UL-related DCI/PDCCH, wherein the first and second PUSCHs could correspond to two PUSCH transmission occasions or repetition in space, time and/or frequency.

In yet another example, a UE (e.g., the UE 116) could receive from the network an UL-related DCI providing/indicating the fourth indicator (or the SRSI). The UE could also be indicated/provided by the network, e.g., in the same UL-related DCI that provides/indicates the fourth indicator (or the SRSI), one or more TCI states. For this design example, the one or more TCI states could be indicated/provided by a TCI codepoint in a TCI indication field of the UL-related DCI (e.g., DCI format 0_1/0_2), wherein the UE could receive from the network a (unified) TCI state(s) activation/deactivation MAC CE command activating/providing/indicating one or more TCI states/sets of TCI states used to map up to Nul (e.g., Nul=4, 8, 16 or etc.) TCI codepoints of the TCI indication field in the corresponding UL DCI format(s)—e.g., DCI format 0_1/0_2. The TCI indication field could be a new/dedicated DCI field introduced in a UL DCI format (e.g., DCI format 0_1 or 0_2). Optionally, the TCI indication field could correspond to one or more bits of one or more existing DCI fields in the corresponding UL DCI format (e.g., DCI format 0_1 or 0_2), e.g., via/by repurposing and/or network's configuration(s)/indication(s). Furthermore, the TCI indication field could be a different/separate field from the fourth indicator/SRSI as specified/defined herein in the present disclosure in the corresponding UL DCI format(s)—e.g., DCI format 0_1/0_2; alternatively, the TCI indication field could be a joint/same field as the fourth indicator/SRSI as specified/defined herein in the present disclosure in the corresponding UL DCI format(s)—e.g., DCI format 0_1/0_2. For this design example, the UE could use/apply the fourth indicator (or the SRSI)—e.g., indicated/provided in the UL-related DCI (e.g., DCI format 0_1/0_2), when applicable, to determine/identify at least which (e.g., the first, the second, or both) of the applied joint/DL/UL TCI states—i.e., after the indicated one or more TCI states by/in the TCI indication field in the UL-related DCI (e.g., DCI format 0_1/0_2) that indicates/provides the fourth indicator/SRSI have become applicable—to use for transmitting the PUSCH(s).

As specified herein in the present disclosure, a value of the fourth indicator/SRSI could be set to '00', '01', '10' or '11'. Furthermore, a value or value(s) of the fourth indicator/SRSI used throughout the present disclosure can be replaced by an index/ID or index(es)/ID(s) of the fourth indicator/SRSI. In addition, the fourth indicator/SRSI (e.g., provided/indicated in a UL-DCI) used throughout the present disclosure can be replaced by the second indicator/TCI selection field (e.g., provided/indicated in a DL-DCI) to achieve the same/similar operation(s)/feature(s)/functionalities. The UE could follow one or more or combination(s) of one or more of the design examples specified herein in the present disclosure to determine/identify the TCI state(s) for transmitting the PUSCH(s), e.g., based on/according to: (i) fixed rule(s)/relation(s) in system specification(s), and/or (ii) network's configuration(s)/indication(s), e.g., via higher layer RRC signaling(s)/parameter(s) and/or MAC CE command(s) and/or dynamic DCI based L1 signaling(s), and/or (iii) UE's autonomous decision/selection/determination/identification, which could also be reported to the network, e.g., in part of a CSI/beam report and/or UE's capability signaling, and/or (iv) one or more conditions/restrictions/limitations specified/described in the design example(s) specified herein in the present disclosure that can or cannot be achieved/held/satisfied.

As specified herein in the present disclosure, in a software-defined cloud interconnection (SDCI) based multi transmission and reception point (MTRP) system wherein a UE could be indicated by the network (e.g., the network 130), e.g., via a beam indication MAC CE/DCI, one or more joint/DL/UL TCI states for transmitting/receiving DL/UL channels/signals and the UE could apply one or more joint/DL/UL TCI states to transmit/receive DL/UL channels/signals, the fourth indicator/SRSI provided/indicated in an UL-related DCI (e.g., DCI format 0_1/0_2) could be used to indicate to the UE, which (the first, the second or both) of the indicated/applied joint/UL TCI states could be used for transmitting the PUSCH(s). Furthermore, when the UE is equipped with multiple antenna panels, there could be a misalignment issue about the UL panel assumptions (i.e., UE panel(s) used for the UL transmission) between the indicated/applied joint/UL TCI state(s) and the SRI indication when they are carried/indicated via two separate DCIs (e.g. joint/UL TCI state indication via DL-related DCI such as DCI format 1_1/1_2, and SRI indication via UL-related DCI such as DCI format 0_1/0_2) and/or they are carried/indicated via two separate DCI fields (e.g., which of the indicated/applied joint/UL TCI state(s) to use for transmitting the PUSCH(s) is via the fourth indicator/SRSI, and the UL TX beam(s)/spatial filter to use for transmitting the SRS(s) is via the SRI). For instance, the UE may determine its UL panel(s) depending on the indicated/applied joint/UL TCI state(s) via the TCI state(s) indicated/provided in a DL-related DCI (e.g., format 1_1 or 1_2 with or without DL assignment) and the fourth indicator/SRSI indicated/provided in an UL-related DCI (e.g., format 0_1 or 0_2). If a SRI provided/indicated in an UL-related DCI (e.g. format 0_1 or 0_2) indicates an SRS resource corresponding to the UL panel(s) that are not aligned with the UL panel(s) corresponding to (or indicated via or determined based on) the indicated/applied joint/UL TCI state(s), whether or not the UE may (or is desired to) switch the UL panel(s) according to the SRI indication is unclear and may lead to misalignment. If the UE switches the UL panel(s) according to the SRI indication, the UL spatial relation (or UL Tx beam(s)) for the switched UE panel(s) may be different from that for the indicated/applied UL spatial relation via the indicated/applied joint/UL TCI state.

Furthermore, when the UE is configured to use PUSCH antenna ports that are the same as the SRS ports of the SRS resource(s) indicated via the SRI, both PUSCH and SRS ports are expected or desired to use the same UL spatial relation (or UL TX beam/spatial filter). For this case, when the PUSCH follows the indicated/applied joint/UL TCI state, the SRS resource(s) indicated via the SRI are desired to follow the indicated/applied joint/UL TCI state.

A few solutions are provided in the present disclosure to address the identified issues herein.

In one embodiment, a UE could be indicated/provided by the network, e.g., via a beam indication MAC CE/DCI (e.g., by a TCI codepoint of the TCI field in the corresponding beam indication DCI—e.g., DCI format 0_1/0_2 with or without UL assignment and/or DCI format 1_1/1_2 with or without DL assignment), one or more joint/DL/UL TCI states for transmitting/receiving UL/DL channels/signals. The UE could also receive from the network, e.g., in a DL-related DCI (e.g., DCI format 1_1/1_2) and/or an UL-related DCI (e.g., DCI format 0_1/0_2), a first SRSI and a first SRI, wherein the SRS resource indicated by the first SRI could be from the SRS resource set indicated by the first SRSI. The UE could use/apply the first SRSI, when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s). Furthermore, the UE could receive from the network, e.g., in a DL-related DCI (e.g., DCI format 1_1/1_2) and/or an UL-related DCI (e.g., DCI format 0_1/0_2), a second SRSI, and the UE could use/apply the second SRSI, when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s). The UE could receive and/or apply the second SRSI (or equivalently, the DL-DCI and/or the UL-DCI that indicates/provides the second SRSI) later in time than the reception and/or application of the first SRSI (and therefore, the DL-DCI and/or the UL-DCI that indicates/provides the first SRSI). The value(s) of the first SRSI and the second SRSI could be different. Furthermore, the first SRSI and/or the second SRSI could be used/applied to indicate which (e.g., the first, second or both) of the indicated/applied TCI states (same for both the first SRSI and the second SRSI) to use/apply for transmitting the PUSCH(s).

In one example, when/if a SRSI (or equivalently, the fourth indicator as specified herein in the present disclosure) is indicated/provided in an UL-related DCI for indicating which (e.g., the first, the second, or both) of the indicated/applied joint/DL/UL TCI states to use for transmitting the PUSCH(s), the UE could be expected to receive, in the same UL-DCI that provides/indicates the SRSI, a SRI, wherein the SRS resource indicated by the SRI is from the SRS resource set indicated by the SRSI. The UE behaviors/assumptions/operations of receiving/applying the one or more TCI states—e.g., indicated/provided via the beam indication MAC CE/DCI, and/or receiving/applying the fourth indicator/SRSI—e.g., indicated/provided via the UL-related DCI, and/or using one or more of the indicated/applied TCI states for transmitting the PUSCH(s), could follow those specified herein in the present disclosure (e.g., according to one or more examples described herein). Specifically, for the above described example, the UE could be expected to receive, in the same UL-DCI that provides/indicates the second SRSI, a second SRI, and the SRS resource indicated by the second SRI could be from the SRS resource set indicated by the second SRSI; furthermore, as specified herein in the present disclosure, the UE could be expected to receive, in the same slot or within a time duration/window, the beam indication MAC CE/DCI that provides/indicates the one or more TCI states and the UL-related DCI that provides/indicates the SRSI and/or the SRI (e.g., the second SRSI and/or the second SRI), and/or the UE could be expected to apply, in the same slot or within a time duration/window, the indicated one or more TCI states and the indicated SRSI/SRI (e.g., the second SRSI/SRI).

In another example, when/if a SRSI (or equivalently, the fourth indicator as specified herein in the present disclosure)

is indicated/provided in an UL-related DCI for indicating which (e.g., the first, the second, or both) of the indicated/applied joint/DL/UL TCI states to use for transmitting the PUSCH(s), and/or when/if the same UL-related DCI that indicates/provides the SRSI does not indicate/provide any SRI(s), the UE could use the latest received/applied SRI to determine/identify a SRS resource from the SRS resource set indicated by the SRSI, and/or determine the UL TX beam(s)/spatial filter(s) for transmitting the SRS resource. Specifically, for the above described example, when/if the UE does not receive any SRI(s) in the same UL-related DCI that provides/indicates the second SRSI, the UE could use the first SRI which is the latest received/applied SRI in this design example (indicated/provided in a different UL-DCI from that provides/indicates the second SRSI) to determine/identify a SRS resource from the SRS resource set indicated by the second SRSI, and/or determine the UL TX beam(s)/spatial filter(s) for transmitting the SRS resource. Optionally, the UE could be indicated/provided/configured by the network, e.g., via higher layer RRC signaling(s)/parameter(s) and/or MAC CE command(s) and/or dynamic DCI based L1 signaling(s), that the indicated first SRI/SRSI (and therefore, the corresponding DCI that indicates/provides the first SRI/SRSI) and the indicated second SRSI (and therefore, the corresponding DCI that indicates/provides the second SRSI) are linked. For example, a linkage indicator, which could correspond to a new/dedicated indicator field in the corresponding DCI format(s) and/or one or more bits of one or more of the existing DCI fields in the corresponding DCI format(s)—e.g., via/by repurposing and/or network's configuration(s)/indication(s) field could be provided/indicated in the DCI (e.g., a DL-DCI format 1_1/1_2 and/or a UL-DCI format 0_1/0_2) that provides/indicates the SRI(s) and/or SRSI(s). For the described design example herein, when/if the linkage indicator(s) or the value(s) of the linkage indicator provided/indicated in the DCI that provides/indicates the first SRI/SRSI and the DCI that provides/indicates the second SRSI is the same/identical, the first SRI/SRSI (and therefore, the corresponding DCI that indicates/provides the first SRI/SRSI) and the second SRSI (and therefore, the corresponding DCI that provides/indicates the second SRSI) are linked. Alternatively, the indicated first SRI/SRSI (and therefore, the corresponding DCI that indicates/provides the first SRI/SRSI) and the indicated second SRSI (and therefore, the corresponding DCI that provides/indicates the second SRSI) could be linked when/if one or more of the following conditions are achieved/satisfied: (i) the second SRSI (and therefore, the corresponding DCI that provides/indicates the second SRSI) is received/applied later in time than the first SRI/SRSI (and therefore, the corresponding DCI that provides/indicates the first SRI/SRSI), (2) the UE receives in the same DCI the first SRI and the first SRSI, and does not receive any SRI(s) in the same DCI in which the UE receives the second SRSI, (3) the UE could apply the same TCI state(s) for transmitting/receiving UL/DL channels/signals before/after the first SRI/SRSI and/or the second SRSI are received/applied. For this design example, when/if the indicated first SRI/SRSI (and therefore, the corresponding DCI that indicates/provides the first SRI/SRSI) and the indicated second SRSI (and therefore, the corresponding DCI that provides/indicates the second SRI) are linked, the UE could use/apply the first SRI to determine/identify a SRS resource from the SRS resource set indicated by the second SRSI (i.e., via the linkage), and/or determine the UL TX beam(s)/spatial filter(s) for transmitting the determined/identified SRS resource.

In yet another example, the UE could be indicated/provided by the network, in the UL-related DCI (e.g., DCI format 0_1/0_2) that provides/indicates the SRSI/fourth indicator as specified herein in the present disclosure, the first SRI and a second SRI. Here, the first SRI and/or the second SRI could be indicated/provided in the UL-DCI (e.g., DCI format 0_1/0_2) by new/dedicated indicator field(s) and/or one or more bits of one or more of the existing DCI fields—e.g., via/by repurposing and/or network's configuration(s)/indication(s). Furthermore, the first SRI and/or the second SRI could be indicated/provided in the UL-DCI (e.g., DCI format 0_1/0_2) by separate/different field(s) from the SRI/SRSI field(s), or jointly with the SRI/SRSI field(s). For instance, the first SRI could be provided by a first SRI field, and the second SRI could be provided by a second SRI field in the corresponding UL-DCI (e.g., DCI format 0_1/0_2). For this design example, when/if a SRSI (or the fourth indicator as specified herein in the present disclosure) is provided, e.g., in an UL-related DCI, to indicate which (e.g., the first, the second, or both) of the applied joint/DL/UL TCI states—i.e., after the indicated one or more TCI states by/in the beam indication DCI have become applicable—to use for transmitting the PUSCH(s), the UE could also use/apply the SRSI to identify/determine which (e.g., the first, the second, or both) of the SRIs indicated/provided in the same UL-related DCI (e.g., DCI format 0_1/0_2) to use for identifying the SRS resource(s) from the corresponding SRS resource set(s) and/or the corresponding UL TX beam(s)/spatial filter(s) for transmitting the identified SRS resource(s).

For example, for the described example herein, when/if applicable, the UE could use the first SRI indicated/provided in the UL-DCI to determine/identify a SRS resource from the SRS resource set indicated by the first SRSI indicated/provided, e.g., in the same UL-related DCI (DCI format 0_1/0_2), and/or determine the corresponding UL TX beam(s)/spatial filter(s) for transmitting the determined/identified SRS resource; When/if applicable, the UE could use the second SRI indicated/provided in the UL-DCI to determine/identify a SRS resource from the SRS resource set indicated by the second SRSI indicated/provided, e.g., in the same UL-related DCI (DCI format 0_1/0_2), and/or determine the corresponding UL TX beam(s)/spatial filter(s) for transmitting the determined/identified SRS resource.

For another example, when/if the first (or second) SRSI indicated/provided, e.g., in an UL-related DCI (DCI format 0_1/0_2), indicates that the first TCI state(s) could be used for transmitting the PUSCH(s), when/if applicable, the UE could use the first SRI, e.g., indicated/provided in the same UL-DCI, to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that the second TCI state(s) could be used for transmitting the PUSCH(s), when/if applicable, the UE could use the second SRI, e.g., indicated/provided in the same UL-DCI, to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that both of the first and second TCI states could be used for transmitting the PUSCH(s), when/if applicable, the UE could use both of the first and second SRIs, e.g., indicated/provided in the same UL-DCI, to determine/identify SRS resources from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resources.

In yet another example, the UE could be indicated/provided by the network, in a beam indication DCI (e.g., a DL-related DCI with format 1_1/1_2 and/or an UL-related DCI with format 0_1/0_2) that provides/indicates one or more TCI states, a SRI. Here, the SRI could be indicated/provided in the beam indication DCI (e.g., DCI format 1_1/1_2 and/or DCI format 0_1/0_2) by a new/dedicated indicator field and/or one or more bits of one or more of the existing DCI fields—e.g., via/by repurposing and/or network's configuration(s)/indication(s). Furthermore, the SRI could be indicated/provided in the beam indication DCI (e.g., DCI format 1_1/1_2 and/or DCI format 0_1/0_2) by a separate/different field from the TCI field, or jointly with the TCI field. For instance, based on network's configuration(s)/indication(s), the second indicator or the TCI selection field (if present) in the DL-related DCI format 1_1/1_2 for indicating which (e.g., the first, second or both) of the indicated/applied joint/DL/UL TCI states to use/apply for receiving the PDSCH(s) could be repurposed to indicate the SRI. When/if a SRI is indicated/provided in a beam indication DCI (e.g., DCI format 1_1/1_2 and/or DCI format 0_1/0_2) that provides/indicates one or more TCI states, and/or when/if a SRSI (or the fourth indicator as specified herein in the present disclosure) is provided, e.g., in an UL-related DCI, to indicate which (e.g., the first, the second, or both) of the applied joint/DL/UL TCI states—i.e., after the indicated one or more TCI states by/in the beam indication DCI have become applicable—to use for transmitting the PUSCH(s), the UE could use the SRI indicated/provided in the beam indication DCI to determine/identify a SRS resource from the SRS resource set indicated by the SRSI indicated/provided in the UL-DCI, and/or determine the UL TX beam(s)/spatial filter(s) for transmitting the SRS resource. Specifically, for the above described example, the first SRI could be indicated/provided in the beam indication DCI (e.g., DCI format 1_1/1_2 with or without DL assignment and/or DCI format 0_1/0_2) that provides/indicates the one or more TCI states. When/if applicable, the UE could use the first SRI indicated/provided in the beam indication DCI to determine/identify a SRS resource from the SRS resource set indicated by the first SRSI indicated/provided, e.g., in an UL-related DCI (DCI format 0_1/0_2), and/or determine the corresponding UL TX beam(s)/spatial filter(s) for transmitting the SRS resource. When/if applicable, the UE could use the first SRI indicated/provided in the beam indication DCI to determine/identify a SRS resource from the SRS resource set indicated by the second SRSI indicated/provided, e.g., in an UL-related DCI (DCI format 0_1/0_2), and/or determine the corresponding UL TX beam(s)/spatial filter(s) for transmitting the SRS resource. The described/specified design procedures herein in this example could be applicable when/if the UL-related DCI (e.g., DCI format 0_1/0_2) that provides/indicates the SRSI does not indicate/provide any SRI(s).

In yet another example, the UE could be indicated/provided by the network, in the beam indication DCI (e.g., a DL-related DCI with format 1_1/1_2 and/or an UL-related DCI with format 0_1/0_2) that provides/indicates the one or more TCI states, the first SRI and a second SRI. Here, the first SRI and/or the second SRI could be indicated/provided in the beam indication DCI (e.g., DCI format 1_1/1_2 and/or DCI format 0_1/0_2) by new/dedicated indicator field(s) and/or one or more bits of one or more of the existing DCI fields—e.g., via/by repurposing and/or network's configuration(s)/indication(s). Furthermore, the first SRI and/or the second SRI could be indicated/provided in the beam indication DCI (e.g., DCI format 1_1/1_2 and/or DCI format 0_1/0_2) by separate/different field(s) from the TCI field, or jointly with the TCI field. For instance, based on network's configuration(s)/indication(s), the second indicator or the TCI selection field (if present) in the DL-related DCI format 1_1/1_2 for indicating which (e.g., the first, second or both) of the indicated/applied joint/DL/UL TCI states to use/apply for receiving the PDSCH(s) could be repurposed to indicate the first SRI and/or the second SRI. For this design example, when/if a SRSI (or the fourth indicator as specified herein in the present disclosure) is provided, e.g., in an UL-related DCI, to indicate which (e.g., the first, the second, or both) of the applied joint/DL/UL TCI states—i.e., after the indicated one or more TCI states by/in the beam indication DCI have become applicable—to use for transmitting the PUSCH(s), the UE could also use/apply the SRSI to identify/determine which (e.g., the first, the second, or both) of the SRIs indicated/provided in the beam indication DCI (e.g., DCI format 1_1/1_2 and/or DCI format 0_1/0_2) to use for identifying the SRS resource(s) from the corresponding SRS resource set(s) and/or the corresponding UL TX beam(s)/spatial filter(s) for transmitting the identified SRS resource(s).

For example, for the described example herein, when/if applicable, the UE could use the first SRI indicated/provided in the beam indication DCI to determine/identify a SRS resource from the SRS resource set indicated by the first SRSI indicated/provided, e.g., in an UL-related DCI (DCI format 0_1/0_2), and/or determine the corresponding UL TX beam(s)/spatial filter(s) for transmitting the determined/identified SRS resource; When/if applicable, the UE could use the second SRI indicated/provided in the beam indication DCI to determine/identify a SRS resource from the SRS resource set indicated by the second SRSI indicated/provided, e.g., in an UL-related DCI (DCI format 0_1/0_2), and/or determine the corresponding UL TX beam(s)/spatial filter(s) for transmitting the determined/identified SRS resource.

For another example, when/if the first (or second) SRSI indicated/provided, e.g., in an UL-related DCI (DCI format 0_1/0_2), indicates that the first TCI state(s) could be used for transmitting the PUSCH(s), when/if applicable, the UE could use the first SRI indicated/provided in the beam indication DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that the second TCI state(s) could be used for transmitting the PUSCH(s), when/if applicable, the UE could use the second SRI indicated/provided in the beam indication DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that both of the first and second TCI states could be used for transmitting the PUSCH(s), when/if applicable, the UE could use both of the first and second SRIs indicated/provided in the beam indication DCI to determine/identify SRS resources from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resources.

Figure 10:
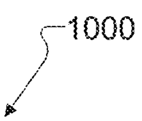
FIG. 10 illustrates a table of example mapping between SRI codepoints and SRI sets for indicating SRS resources according to embodiments of the present disclosure.

FIG. 10 illustrates a table 1000 of example mapping between SRI codepoints and SRI sets for indicating SRS resources according to embodiments of the present disclosure. For example, table 1000 of example mapping between SRI codepoints and SRI sets for indicating SRS resources may be referenced by any of the UEs 111-116 of FIG. 1, such as the UE 113 of FIG. 1. This example is for illustration only and other embodiments can be used without departing from the scope of the present disclosure.

In yet another example, the UE could be first configured/indicated/provided by the network, e.g., via higher layer RRC signaling(s)/parameter(s) and/or MAC CE command(s) and/or dynamic DCI based L1 signaling(s), one or more sets of SRIs, wherein a set of SRIs can comprise one or two SRIs, denoted by SRI-1 and/or SRI-2; when/if two SRS resource sets-denoted by a first SRS resource set and a second SRS resource set—are configured/provided/indicated to the UE, (i) SRI-1 and SRI-2 could indicate two SRS resources respectively from the first and second SRS resource sets, and/or (ii) SRI-1 and SRI-2 could indicate two SRS resources from either the first or the second SRS resource set, and/or (iii) SRI-1 (SRI-2) could indicate a SRS resource from either the first or the second SRS resource set. For instance, the UE could first receive from the network, e.g., a SRI(s) activation/deactivation MAC CE (see FIG. 10), wherein the SRI(s) activation/deactivation MAC CE could comprise/activate/provide/configure/indicate one or more (e.g., up to Nsr≥1 with Nsri≥1 such as Nsri=4, 8, 16, 32) sets of SRIs with each set mapped to a (SRI) codepoint of a DCI field in a DCI (e.g., a beam indication DCI with format 1_1/1_2 and/or format 0_1/0_2 that provides/indicates the one or more TCI states and/or an UL-related DCI with format 0_1/0_2 that provides/indicates the SRSI(s)/fourth indicator(s) as specified herein in the present disclosure). Furthermore, as shown in FIG. 10, each set could comprise one or two SRIs.

For example, the UE could be indicated/provided by the network, e.g., via/by the beam indication DCI (e.g., DCI format 1_1/1_2 and/or DCI format 0_1/0_2) that provides/indicates the one or more TCI states, a set of two SRIs-SRI-1 and SRI-2—of a SRI codepoint in a SRI indication field, wherein the value of SRI-1 could correspond to the first SRI and the value of SRI-2 could correspond to a second SRI according to the described design example herein. Here, the SRI indication field could be indicated/provided in the beam indication DCI (e.g., DCI format 1_1/1_2 and/or DCI format 0_1/0_2) by new/dedicated indicator field(s) and/or one or more bits of one or more of the existing DCI fields—e.g., via/by repurposing and/or network's configuration(s)/indication(s). Furthermore, the SRI indication field could be indicated/provided in the beam indication DCI (e.g., DCI format 1_1/1_2 and/or DCI format 0_1/0_2) by separate/different field(s) from the TCI field, or jointly with the TCI field. For instance, based on network's configuration(s)/indication(s), the second indicator or the TCI selection field (if present) in the DL-related DCI format 1_1/1_2 for indicating which (e.g., the first, second or both) of the indicated/applied joint/DL/UL TCI states to use/apply for receiving the PDSCH(s) could be repurposed to indicate the SRI indication field as specified herein in the present disclosure.

In one example, when/if applicable, the UE could use the first SRI indicated/provided by the SRI codepoint of the SRI indication field in the beam indication DCI to determine/identify a SRS resource from the SRS resource set indicated by the first SRSI indicated/provided, e.g., in an UL-related DCI (DCI format 0_1/0_2), and/or determine the corresponding UL TX beam(s)/spatial filter(s) for transmitting the determined/identified SRS resource; When/if applicable, the UE could use the second SRI indicated/provided by the SRI codepoint of the SRI field in the beam indication DCI to determine/identify a SRS resource from the SRS resource set indicated by the second SRSI indicated/provided, e.g., in an UL-related DCI (DCI format 0_1/0_2), and/or determine the corresponding UL TX beam(s)/spatial filter(s) for transmitting the determined/identified SRS resource.

In another example, when/if the first (or second) SRSI indicated/provided, e.g., in an UL-related DCI (DCI format 0_1/0_2), indicates that the first TCI state(s) could be used for transmitting the PUSCH(s), when/if applicable, the UE (e.g., the UE 116) could use the first SRI indicated/provided by the SRI codepoint of the SRI field in the beam indication DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that the second TCI state(s) could be used for transmitting the PUSCH(s), when/if applicable, the UE could use the second SRI indicated/provided by the SRI codepoint of the SRI field in the beam indication DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that both of the first and second TCI states could be used for transmitting the PUSCH(s), when/if applicable, the UE could use both of the first and second SRIs indicated/provided by the SRI codepoint of the SRI field in the beam indication DCI to determine/identify SRS resources from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resources.

For another example, the UE could be indicated/provided by the network (e.g., the network 130), e.g., via/by the UL-DCI (e.g., DCI format 0_1/0_2) that provides/indicates the SRSI/fourth indicator as specified herein in the present disclosure, a set of two SRIs-SRI-1 and SRI-2—of a SRI codepoint in a SRI indication field, wherein the value of SRI-1 could correspond to the first SRI and the value of SRI-2 could correspond to a second SRI according to the described design example herein. Here, the SRI indication field could be indicated/provided in the UL-related DCI (e.g., DCI format 0_1/0_2) by new/dedicated indicator field(s) and/or one or more bits of one or more of the existing DCI fields—e.g., via/by repurposing and/or network's configuration(s)/indication(s). Furthermore, the SRI indication field could be indicated/provided in the UL-related DCI (e.g., DCI format 0_1/0_2) by separate/different field(s) from the SRSI/fourth indicator field and/or the SRI field, or jointly with the SRSI/fourth indicator field and/or the SRI field.

In one example, when/if applicable, the UE could use the first SRI indicated/provided by the SRI codepoint of the SRI indication field in the UL-DCI to determine/identify a SRS resource from the SRS resource set indicated by the first SRSI indicated/provided, e.g., in the UL-related DCI (DCI format 0_1/0_2), and/or determine the corresponding UL TX beam(s)/spatial filter(s) for transmitting the determined/identified SRS resource; When/if applicable, the UE could use the second SRI indicated/provided by the SRI codepoint of the SRI field in the UL-DCI to determine/identify a SRS resource from the SRS resource set indicated by the second SRSI indicated/provided, e.g., in the UL-related DCI (DCI format 0_1/0_2), and/or determine the corresponding UL TX beam(s)/spatial filter(s) for transmitting the determined/identified SRS resource.

In another example, when/if the first (or second) SRSI indicated/provided, e.g., in an UL-related DCI (DCI format 0_1/0_2), indicates that the first TCI state(s) could be used for transmitting the PUSCH(s), when/if applicable, the UE could use the first SRI indicated/provided by the SRI codepoint of the SRI field in the UL-DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that the second TCI state(s) could be used for transmitting the PUSCH(s), when/if applicable, the UE could use the second SRI indicated/provided by the SRI codepoint of the SRI field in the UL-DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that both of the first and second TCI states could be used for transmitting the PUSCH(s), when/if applicable, the UE could use both of the first and second SRIs indicated/provided by the SRI codepoint of the SRI field in the UL-DCI to determine/identify SRS resources from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resources.

Yet for another example, the UE could be indicated/provided by the network, e.g., via/by the beam indication DCI (e.g., DCI format 1_1/1_2 and/or DCI format 0_1/0_2) that provides/indicates the one or more TCI states, a single SRI—SRI-1 or SRI-2—of a SRI codepoint in a SRI indication field, wherein the value of SRI-1 or SRI-2 could correspond to the first SRI according to the described design example herein. Here, the SRI indication field could be indicated/provided in the beam indication DCI (e.g., DCI format 1_1/1_2 and/or DCI format 0_1/0_2) by new/dedicated indicator field(s) and/or one or more bits of one or more of the existing DCI fields—e.g., via/by repurposing and/or network's configuration(s)/indication(s). Furthermore, the SRI indication field could be indicated/provided in the beam indication DCI (e.g., DCI format 1_1/1_2 and/or DCI format 0_1/0_2) by separate/different field(s) from the TCI field, or jointly with the TCI field. For instance, based on network's configuration(s)/indication(s), the second indicator or the TCI selection field (if present) in the DL-related DCI format 1_1/1_2 for indicating which (e.g., the first, second or both) of the indicated/applied joint/DL/UL TCI states to use/apply for receiving the PDSCH(s) could be repurposed to indicate the SRI indication field. For this case, when/if applicable, the UE could use the first SRI indicated/provided by the SRI codepoint of the SRI indication field in the beam indication DCI to determine/identify a SRS resource from the SRS resource set indicated by the first SRSI indicated/provided, e.g., in an UL-related DCI (DCI format 0_1/0_2), and/or determine the corresponding UL TX beam(s)/spatial filter(s) for transmitting the determined/identified SRS resource; When/if applicable, the UE could use the first SRI indicated/provided by the SRI codepoint of the SRI field in the beam indication DCI to determine/identify a SRS resource from the SRS resource set indicated by the second SRSI indicated/provided, e.g., in an UL-related DCI (DCI format 0_1/0_2), and/or determine the corresponding UL TX beam(s)/spatial filter(s) for transmitting the determined/identified SRS resource.

Yet for another example, the UE could be indicated/provided by the network, e.g., via/by the UL-DCI (e.g., DCI format 0_1/0_2) that provides/indicates the SRSI/fourth indicator as specified herein in the present disclosure, a single SRI—SRI-1 or SRI-2—of a SRI codepoint in a SRI indication field, wherein the value of SRI-1 or SRI-2 could correspond to the first SRI according to the described design example herein. Here, the SRI indication field could be indicated/provided in the UL-related DCI (e.g., DCI format 0_1/0_2) by new/dedicated indicator field(s) and/or one or more bits of one or more of the existing DCI fields—e.g., via/by repurposing and/or network's configuration(s)/indication(s). Furthermore, the SRI indication field could be indicated/provided in the UL-related DCI (e.g., DCI format 0_1/0_2) by separate/different field(s) from the SRSI/fourth indicator field and/or the SRI field, or jointly with the SRSI/fourth indicator field and/or the SRI field. For this case, when/if applicable, the UE could use the first SRI indicated/provided by the SRI codepoint of the SRI indication field in the UL-DCI to determine/identify a SRS resource from the SRS resource set indicated by the first SRSI indicated/provided, e.g., in the UL-related DCI (DCI format 0_1/0_2), and/or determine the corresponding UL TX beam(s)/spatial filter(s) for transmitting the determined/identified SRS resource; When/if applicable, the UE could use the first SRI indicated/provided by the SRI codepoint of the SRI field in the UL-DCI to determine/identify a SRS resource from the SRS resource set indicated by the second SRSI indicated/provided, e.g., in the UL-related DCI (DCI format 0_1/0_2), and/or determine the corresponding UL TX beam(s)/spatial filter(s) for transmitting the determined/identified SRS resource.

Yet for another example, the UE could be indicated/provided by the network, e.g., via/by the beam indication DCI (e.g., DCI format 1_1/1_2 and/or DCI format 0_1/0_2) that provides/indicates the one or more TCI states, a single SRI—SRI-1 or SRI-2—of a SRI codepoint in a SRI indication field, wherein the value of SRI-1 could correspond to the first SRI and the value of SRI-2 could correspond to a second SRI according to the described design example herein. In this design example, the UE could be indicated/provided/configured by the network, e.g., via higher layer RRC signaling(s)/parameter(s) and/or MAC CE command(s) and/or dynamic DCI based L1 signaling(s), whether the indicated SRI corresponds to SRI-1 (and therefore, the first SRI) or SRI-2 (and therefore, the second SRI). For instance, in the SRI(s) activation/deactivation MAC CE, each set of SRI(s)—mapped to a SRI codepoint of a SRI indication field in a DCI—that comprises/contains/includes a single SRI could be associated/linked to a (one-bit) flag indicator, which is also indicated/provided/configured in the same SRI(s) activation/deactivation MAC CE. For a set of SRI(s)—mapped to a SRI codepoint of a SRI indication field in a DCI—that comprises/contains/includes a single SRI, when/if the corresponding/associated (one-bit) flag indicator is set to '0' (or '1'), the SRI could correspond to SRI-1, and when/if the corresponding/associated (one-bit) flag indicator is set to '1' (or '0'), the SRI could correspond to SRI-2. Here, the SRI indication field could be indicated/provided in the beam indication DCI (e.g., DCI format 1_1/1_2 and/or DCI format 0_1/0_2) by new/dedicated indicator field(s) and/or one or more bits of one or more of the existing DCI fields—e.g., via/by repurposing and/or network's configuration(s)/indication(s). Furthermore, the SRI indication field could be indicated/provided in the beam indication DCI (e.g., DCI format 1_1/1_2 and/or DCI format 0_1/0_2) by separate/different field(s) from the TCI field, or jointly with the TCI field. For instance, based on network's configuration(s)/indication(s), the second indicator or the TCI selection field (if present) in the DL-related DCI format 1_1/1_2 for indicating which (e.g., the first, second or both) of the indicated/applied joint/DL/UL TCI states to use/apply for receiving the PDSCH(s) could be repurposed to indicate the SRI indication field.

In one example, when/if applicable/available, the UE could use the first SRI indicated/provided by the SRI codepoint of the SRI indication field in the beam indication DCI to determine/identify a SRS resource from the SRS resource set indicated by the first (or second) SRSI indicated/provided, e.g., in an UL-related DCI (DCI format 0_1/0_2), and/or determine the corresponding UL TX beam(s)/spatial filter(s) for transmitting the determined/identified SRS resource; When/if applicable/available, the UE could use the second SRI indicated/provided by the SRI codepoint of the SRI field in the beam indication DCI to determine/identify a SRS resource from the SRS resource set indicated by the second (or first) SRSI indicated/provided, e.g., in an UL-related DCI (DCI format 0_1/0_2), and/or determine the corresponding UL TX beam(s)/spatial filter(s) for transmitting the determined/identified SRS resource.

In another example, when/if the first (or second) SRSI indicated/provided, e.g., in an UL-related DCI (DCI format 0_1/0_2), indicates that at least the first TCI state(s) could be used for transmitting the PUSCH(s), when/if applicable/available, the UE could use at least the first SRI indicated/provided by the SRI codepoint of the SRI field in the beam indication DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that at least the second TCI state(s) could be used for transmitting the PUSCH(s), when/if applicable/available, the UE could use at least the second SRI indicated/provided by the SRI codepoint of the SRI field in the beam indication DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

Yet for another example, the UE could be indicated/provided by the network, e.g., via/by the UL-DCI (e.g., DCI format 0_1/0_2) that provides/indicates the SRSI/fourth indicator as specified herein in the present disclosure, a single SRI—SRI-1 or SRI-2—of a SRI codepoint in a SRI indication field, wherein the value of SRI-1 could correspond to the first SRI and the value of SRI-2 could correspond to a second SRI according to the described design example herein. In this design example, the UE could be indicated/provided/configured by the network, e.g., via higher layer RRC signaling(s)/parameter(s) and/or MAC CE command(s) and/or dynamic DCI based L1 signaling(s), whether the indicated SRI corresponds to SRI-1 (and therefore, the first SRI) or SRI-2 (and therefore, the second SRI). For instance, in the SRI(s) activation/deactivation MAC CE, each set of SRI(s)—mapped to a SRI codepoint of a SRI indication field in a DCI—that comprises/contains/includes a single SRI could be associated/linked to a (one-bit) flag indicator, which is also indicated/provided/configured in the same SRI(s) activation/deactivation MAC CE. For a set of SRI(s)—mapped to a SRI codepoint of a SRI indication field in a DCI—that comprises/contains/includes a single SRI, when/if the corresponding/associated (one-bit) flag indicator is set to '0' (or '1'), the SRI could correspond to SRI-1. When/if the corresponding/associated (one-bit) flag indicator is set to '1' (or '0'), the SRI could correspond to SRI-2. Here, the SRI indication field could be indicated/provided in the UL-related DCI (e.g., DCI format 0_1/0_2) by new/dedicated indicator field(s) and/or one or more bits of one or more of the existing DCI fields—e.g., via/by repurposing and/or network's configuration(s)/indication(s). Furthermore, the SRI indication field could be indicated/provided in the UL-related DCI (e.g., DCI format 0_1/0_2) by separate/different field(s) from the SRSI/fourth indicator field and/or the SRI field, or jointly with the SRSI/fourth indicator field and/or the SRI field.

In one example, when/if applicable/available, the UE could use the first SRI indicated/provided by the SRI codepoint of the SRI indication field in the UL-DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; When/if applicable/available, the UE could use the second SRI indicated/provided by the SRI codepoint of the SRI field in the UL-DCI to determine/identify a SRS resource from the SRS resource set indicated by the second (or first) SRSI indicated/provided, e.g., in the UL-related DCI (DCI format 0_1/0_2), and/or determine the corresponding UL TX beam(s)/spatial filter(s) for transmitting the determined/identified SRS resource.

In another example, when/if the first (or second) SRSI indicated/provided, e.g., in an UL-related DCI (DCI format 0_1/0_2), indicates that at least the first TCI state(s) could be used for transmitting the PUSCH(s), when/if applicable/available, the UE could use at least the first SRI indicated/provided by the SRI codepoint of the SRI field in the UL-DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that at least the second TCI state(s) could be used for transmitting the PUSCH(s), when/if applicable/available, the UE could use at least the second SRI indicated/provided by the SRI codepoint of the SRI field in the UL-DCI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

Figure 11:
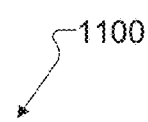
FIG. 11 illustrates a table of example mapping between SRI codepoints and TCI states for identifying/determining the SRI/value of the SRI according to embodiments of the present disclosure.

FIG. 11 illustrates a table 1100 of example mapping between SRI codepoints and TCI states for identifying/determining the SRI/value of the SRI according to embodiments of the present disclosure. For example, table 1100 of example mapping between SRI codepoints and TCI states for identifying/determining the SRI/value of the SRI may be referenced by any of the UEs 111-116 of FIG. 1, such as the UE 114 of FIG. 1. This example is for illustration only and other embodiments can be used without departing from the scope of the present disclosure.

In yet another example, the UE could be indicated/configured/provided by the network, e.g., via higher layer RRC signaling(s)/parameter(s) and/or MAC CE command(s) and/or dynamic DCI based L1 signaling(s), association/mapping rule(s)/relation(s) between one or more TCI states and one or more SRIs.

For example, higher layer parameter(s), e.g., TCI-State, DLorJointTCI-State, UL-TCIState and/or QCL-Info, could configure/provide/comprise/include/contain one or more values of SRI or SRIs. Here, a TCI state provided by TCI-State, DLorJointTCI-State, UL-TCIState and/or QCL-Info could be associated with one or more SRIs when/if the one or more SRIs are also provided in the same TCI-State, DLorJointTCI-State, UL-TCIState and/or QCL-Info.

For another example, higher layer parameter(s), e.g., TCI-State, DLorJointTCI-State, UL-TCIState and/or QCL-Info, could configure/provide/comprise/include/contain one or more SRI codepoints or SRI codepoint indexes/IDs (as shown in FIG. 10), wherein each SRI codepoint or SRI codepoint index/ID could correspond to one or more values of SRI or SRIs. Here, a TCI state provided by TCI-State, DLorJointTCI-State, UL-TCIState and/or QCL-Info could be associated with one or more SRIs when/if a SRI codepoint or SRI codepoint index/ID (as shown in FIG. 10) corresponding to the one or more SRIs is provided in the same TCI-State, DLorJointTCI-State, UL-TCIState and/or QCL-Info.

Yet for another example, the UE could be indicated/provided/configured by the network, e.g., via higher layer RRC signaling(s)/parameter(s) and/or MAC CE command(s) and/or dynamic DCI based L1 signaling(s), one or more groups of TCI states each comprising one or more TCI states from a list/set/pool of higher layer RRC configured TCI states, wherein each configured TCI state could be provided by TCI-State, DLorJointTCI-State, ULTCI-State and/or QCL-Info. For this design example, each of the groups of TCI states could be associated with/to a value of SRI or SRI. For instance, the higher layer RRC parameter(s)/signaling(s) that provides/configures the list/set/pool of TCI states (and therefore, the one or more groups of TCI states) could also provide/configure/indicate/comprise/contain a list/set/pool of SRIs; for this case, a/the first group of TCI states or the group of TCI states with the lowest/highest TCI state group ID/index (and therefore, the TCI states/TCI state IDs configured/provided/indicated therein) could be associated to/with a/the first SRI or the lowest SRI in the list/set/pool of SRIs, a/the second group of TCI states or the group of TCI states with the second lowest/highest TCI state group ID/index (and therefore, the TCI states/TCI state IDs configured/provided/indicated therein) could be associated to/with a/the second SRI or the second lowest SRI in the list/set/pool of SRIs, a/the third group of TCI states or the group of TCI states with the third lowest/highest TCI state group ID/index (and therefore, the TCI states/TCI state IDs configured/provided/indicated therein) could be associated to/with a/the third SRI or the third lowest SRI in the list/set/pool of SRIs, and so on. Alternatively, higher layer RRC parameter(s)/signaling(s) that provides/configures a group of TCI states could indicate/provide/configure/comprise/include/contain one or more values of SRIs or SRIs; for this case, the TCI states/TCI state IDs configured/provided/indicated in a group of TCI states/TCI state IDs could be associated/corresponding to one or more SRIs when/if the one or more SRIs are also provided/indicated/configured in the same higher layer parameter(s) that configures the group of TCI states/TCI state IDs.

Yet for another example, the UE could be indicated/provided/configured by the network, e.g., via higher layer RRC signaling(s)/parameter(s) and/or MAC CE command(s) and/or dynamic DCI based L1 signaling(s), one or more groups of TCI states each comprising one or more TCI states from a list/set/pool of higher layer RRC configured TCI states, wherein each configured TCI state could be provided by TCI-State, DLorJointTCI-State, ULTCI-State and/or QCL-Info. For this design example, each of the groups of TCI states could be associated with/to one or more SRI codepoints or SRI codepoint indexes/IDs (as illustrated in FIG. 10), wherein each SRI codepoint or SRI codepoint index/ID could correspond to one or more values of SRIs or SRIs. For instance, the higher layer RRC parameter(s)/signaling(s) that provides/configures the list/set/pool of TCI states (and therefore, the one or more groups of TCI states) could also provide/configure/indicate/comprise/contain a list/set/pool of SRI codepoints or SRI codepoint indexes/IDs (similar to that shown in FIG. 10); for this case, a/the first group of TCI states or the group of TCI states with the lowest/highest TCI state group ID/index (and therefore, the TCI states/TCI state IDs configured/provided/indicated therein) could be associated to/with a/the first SRI codepoint or SRI codepoint index/ID or the lowest SRI codepoint or SRI codepoint index/ID in the list/set/pool of SRI codepoints or SRI codepoint indexes/IDs, a/the second group of TCI states or the group of TCI states with the second lowest/highest TCI state group ID/index (and therefore, the TCI states/TCI state IDs configured/provided/indicated therein) could be associated to/with a/the second SRI codepoint or SRI codepoint index/ID or the second lowest SRI codepoint or SRI codepoint index/ID in the list/set/pool of SRI codepoints or SRI codepoint indexes/IDs, a/the third group of TCI states or the group of TCI states with the third lowest/highest TCI state group ID/index (and therefore, the TCI states/TCI state IDs configured/provided/indicated therein) could be associated to/with a/the third SRI codepoint or SRI codepoint index/ID or the third lowest SRI codepoint or SRI codepoint index/ID in the list/set/pool of SRI codepoints or SRI codepoint indexes/IDs, and so on. Alternatively, higher layer RRC parameter(s)/signaling(s) that provides/configures a group of TCI states could indicate/provide/configure/comprise/include/contain one or more SRI codepoints or SRI codepoint indexes/IDs; for this case, the TCI states/TCI state IDs configured/provided/indicated in a group of TCI states/TCI state IDs could be associated/corresponding to one or more SRIs when/if the SRI codepoint or SRI codepoint index/ID corresponding to the one or more SRIs is also provided/indicated/configured in the same higher layer parameter(s) that configures the group of TCI states/TCI state IDs.

Yet for another example, the UE could be indicated/provided/configured by the network, e.g., via higher layer RRC signaling(s)/parameter(s) and/or MAC CE command(s) and/or dynamic DCI based L1 signaling(s), a linkage between the one or more TCI states and the one or more SRIs/values of SRI. As illustrated in FIG. 11 TCI state/TCI state ID is one-to-one linked/mapped to a SRI; hence, when a TCI state/TCI state ID is indicated to the UE (e.g., via the beam indication MAC CE/DCI), the UE could identify/determine, based on/according to the linkage (e.g., the look-up table shown in FIG. 11), the SRI or value of SRI that is linked/mapped to the indicated TCI state/TCI state ID.

Yet for another example, the UE could be indicated/provided/configured by the network, e.g., via higher layer RRC signaling(s)/parameter(s) and/or MAC CE command(s) and/or dynamic DCI based L1 signaling(s), a linkage between the one or more TCI states and one or more SRI codepoints or SRI codepoint indexes/IDs. As illustrated in FIG. 11, a TCI state/TCI state ID is one-to-one linked/mapped to a SRI codepoint or SRI codepoint index/ID, wherein a SRI codepoint or SRI codepoint index/ID could correspond to one or more SRIs/values of SRI (as illustrated in FIG. 10); hence, when a TCI state/TCI state ID is indicated to the UE (e.g., via the beam indication MAC CE/DCI), the UE could identify/determine, based on/according to the linkage (e.g., the look-up table shown in FIG. 11), the SRI codepoint/SRI codepoint index/ID (and therefore, the corresponding SRIs) that is linked/mapped to the indicated TCI state/TCI state ID.

Yet for another example, a UE could receive from the network a (unified) TCI state(s) activation/deactivation MAC CE providing/indicating/activating one or more TCI states/sets of TCI states with each TCI state/set of TCI states provided/indicated/activated therein map to a TCI codepoint of the TCI field in a beam indication DCI. For this design example, each TCI state/set of TCI states provided/indicated/activated in the (unified) TCI state(s) activation/deactivation MAC CE—used to map to a TCI codepoint of the TCI field in the beam indication DCI-could be associated with/to a SRI/value of SRI, wherein the SRI(s)/value(s) of SRI could also be indicated/provided in the same (unified) TCI state(s) activation/deactivation MAC CE command (e.g., via one or more new fields or via/by repurposing one or more existing fields in the MAC CE based on network's configuration(s)/indication(s)). For instance, a set of SRIs/values of SRIs could be provided/indicated in the (unified) TCI state(s) activation/deactivation MAC CE; for this case, the first TCI state/set of TCI states or the TCI state/set of TCI states with the lowest TCI state ID/TCI state set index/ID in the MAC CE could be associated to the first SRI or the lowest SRI value in the set of SRIs in the MAC CE, the second TCI state/set of TCI states or the TCI state/set of TCI states with the second lowest TCI state ID/TCI state set index/ID in the MAC CE could be associated to the second SRI or the second lowest SRI value in the set of SRIs in the MAC CE, and so on. The last TCI state/set of TCI states, or the TCI state/set of TCI states with the highest TCI state ID/TCI state set index/ID in the MAC CE could be associated to the last SRI or the highest SRI value in the set of SRIs in the MAC CE. Hence, when/if the UE is provided/indicated by the network, e.g., via a TCI codepoint of the TCI field in the beam indication DCI, a TCI state/set of TCI states, the UE could also identify/determine the SRI/value of SRI associated/corresponding to the indicated TCI state(s) as specified herein in the present disclosure.

Yet for another example, a UE could receive from the network a (unified) TCI state(s) activation/deactivation MAC CE providing/indicating/activating one or more TCI states/sets of TCI states with each TCI state/set of TCI states provided/indicated/activated therein map to a TCI codepoint of the TCI field in a beam indication DCI. The UE could also receive from network a SRI(s) activation/deactivation MAC CE command (as illustrated in FIG. 10) providing/indicating/activating a set of SRIs/values of SRI. For this design example, the UE could be indicated/provided/configured by the network, e.g., via higher layer RRC signaling(s)/parameter(s) and/or MAC CE command(s) and/or dynamic DCI based L1 signaling(s), association(s)/mapping(s) between one or more of the TCI states/sets of TCI states indicated/provided in the (unified) TCI state(s) activation/deactivation MAC CE and one or more of the SRIs/values of SRI indicated/provided in the SRI(s) activation/deactivation MAC CE. For instance, each TCI state/set of TCI states provided/indicated/activated in the (unified) TCI state(s) activation/deactivation MAC CE—used to map to a TCI codepoint of the TCI field in the beam indication DCI-could be associated with/to a SRI/value of SRI indicated/provided in the SRI(s) activation/deactivation MAC CE. For this case, the first TCI state/set of TCI states or the TCI state/set of TCI states with the lowest TCI state ID/TCI state set index/ID in the (unified) TCI state(s) activation/deactivation MAC CE could be associated to the first SRI or the lowest SRI value in the set of SRIs in the SRI(s) activation/deactivation MAC CE, the second TCI state/set of TCI states or the TCI state/set of TCI states with the second lowest TCI state ID/TCI state set index/ID in the (unified) TCI state(s) activation/deactivation MAC CE could be associated to the second SRI or the second lowest SRI value in the set of SRIs in the SRI(s) activation/deactivation MAC CE, and so on. The last TCI state/set of TCI states, or the TCI state/set of TCI states with the highest TCI state ID/TCI state set index/ID in the (unified) TCI state(s) activation/deactivation MAC CE could be associated to the last SRI or the highest SRI value in the set of SRIs in the SRI(s) activation/deactivation MAC CE. Hence, when/if the UE is provided/indicated by the network, e.g., via a TCI codepoint of the TCI field in the beam indication DCI, a TCI state/set of TCI states, the UE could also identify/determine the SRI/value of SRI associated/corresponding to the indicated TCI state(s) as specified herein in the present disclosure.

Yet for another example, a UE (e.g., the UE 116) could receive from the network (e.g., the network 130) a (unified) TCI state(s) activation/deactivation MAC CE providing/indicating/activating one or more TCI states/sets of TCI states with each TCI state/set of TCI states provided/indicated/activated therein map to a TCI codepoint of the TCI field in a beam indication DCI. For this design example, each TCI state/set of TCI states provided/indicated/activated in the (unified) TCI state(s) activation/deactivation MAC CE—used to map to a TCI codepoint of the TCI field in the beam indication DCI-could be associated with/to a SRI codepoint or SRI codepoint index/ID, wherein the SRI codepoint(s) or SRI codepoint index(es)/ID(s) could also be indicated/provided in the same (unified) TCI state(s) activation/deactivation MAC CE command (e.g., via one or more new fields or via/by repurposing one or more existing fields in the MAC CE based on network's configuration(s)/indication(s)), and each SRI codepoint/SRI codepoint index/

ID could correspond to one or more SRIs/values of SRI (as shown in FIG. 10). For instance, a list/set/pool of SRI codepoints/SRI codepoint indexes/IDs could be provided/indicated in the (unified) TCI state(s) activation/deactivation MAC CE; for this case, the first TCI state/set of TCI states or the TCI state/set of TCI states with the lowest TCI state ID/TCI state set index/ID in the MAC CE could be associated to the first SRI codepoint/SRI codepoint index/ID or the lowest SRI codepoint/SRI codepoint index/ID (and therefore, the corresponding SRI(s)) in the list/set/pool of SRI codepoints/SRI codepoint indexes/IDs in the MAC CE, the second TCI state/set of TCI states or the TCI state/set of TCI states with the second lowest TCI state ID/TCI state set index/ID in the MAC CE could be associated to the second SRI codepoint/SRI codepoint index/ID or the second lowest SRI codepoint/SRI codepoint index/ID (and therefore, the corresponding SRI(s)) in the list/set/pool of SRI codepoints/SRI codepoint indexes/IDs in the MAC CE, and so on. The last TCI state/set of TCI states, or the TCI state/set of TCI states with the highest TCI state ID/TCI state set index/ID in the MAC CE could be associated to the last SRI codepoint/SRI codepoint index/ID or the highest SRI codepoint/SRI codepoint index/ID (and therefore, the corresponding SRI(s)) in the list/set/pool of SRI codepoints/SRI codepoint indexes/IDs in the MAC CE. Hence, when/if the UE is provided/indicated by the network, e.g., via a TCI codepoint of the TCI field in the beam indication DCI, a TCI state/set of TCI states, the UE could also identify/determine the SRI codepoint/SRI codepoint index/ID (and therefore, the corresponding SRI(s)) associated/corresponding to the indicated TCI state(s) as specified herein in the present disclosure.

Yet for another example, a UE could receive from the network a (unified) TCI state(s) activation/deactivation MAC CE providing/indicating/activating one or more TCI states/sets of TCI states with each TCI state/set of TCI states provided/indicated/activated therein map to a TCI codepoint of the TCI field in a beam indication DCI. The UE could also receive from network a SRI(s) activation/deactivation MAC CE command (as shown in FIG. 10) providing/indicating/activating a list/set/pool of SRI codepoints/SRI codepoint indexes/IDs with each SRI codepoint/SRI codepoint index/ID corresponding to one or more SRIs/values of SRI. For this design example, the UE could be indicated/provided/configured by the network, e.g., via higher layer RRC signaling(s)/parameter(s) and/or MAC CE command(s) and/or dynamic DCI based L1 signaling(s), association(s)/mapping(s) between one or more of the TCI states/sets of TCI states indicated/provided in the (unified) TCI state(s) activation/deactivation MAC CE and one or more of the SRI codepoints/SRI codepoint indexes/IDs (and therefore, the corresponding SRI(s)) indicated/provided in the SRI(s) activation/deactivation MAC CE. For instance, each TCI state/set of TCI states provided/indicated/activated in the (unified) TCI state(s) activation/deactivation MAC CE—used to map to a TCI codepoint of the TCI field in the beam indication DCI-could be associated with/to a SRI codepoint/SRI codepoint index/ID (and therefore, the corresponding SRIs) indicated/provided in the SRI(s) activation/deactivation MAC CE. For this case, the first TCI state/set of TCI states or the TCI state/set of TCI states with the lowest TCI state ID/TCI state set index/ID in the (unified) TCI state(s) activation/deactivation MAC CE could be associated to the first SRI codepoint/SRI codepoint index/ID or the lowest SRI codepoint/SRI codepoint index/ID (and therefore, the corresponding SRI(s)) in the list/set/pool of SRI codepoints/SRI codepoint indexes/IDs in the SRI(s) activation/deactivation MAC CE, the second TCI state/set of TCI states or the TCI state/set of TCI states with the second lowest TCI state ID/TCI state set index/ID in the (unified) TCI state(s) activation/deactivation MAC CE could be associated to the second SRI codepoint/SRI codepoint index/ID or the second lowest SRI codepoint/SRI codepoint index/ID (and therefore, the corresponding SRI(s)) in the list/set/pool of SRI codepoints/SRI codepoint indexes/IDs in the SRI(s) activation/deactivation MAC CE, and so on. The last TCI state/set of TCI states or the TCI state/set of TCI states with the highest TCI state ID/TCI state set index/ID in the (unified) TCI state(s) activation/deactivation MAC CE could be associated to the last SRI codepoint/SRI codepoint index/ID or the highest SRI codepoint/SRI codepoint index/ID (and therefore, the corresponding SRI(s)) in the list/set/pool of SRI codepoints/SRI codepoint indexes/IDs in the SRI(s) activation/deactivation MAC CE. Hence, when/if the UE is provided/indicated by the network, e.g., via a TCI codepoint of the TCI field in the beam indication DCI, a TCI state/set of TCI states, the UE could also identify/determine the SRI codepoint/SRI codepoint index/ID (and therefore, the corresponding SRI(s)) associated/corresponding to the indicated TCI state(s) as specified herein in the present disclosure.

As specified herein in the present disclosure, a UE could be indicated/provided by the network, e.g., via a beam indication MAC CE/DCI (e.g., by a TCI codepoint of the TCI field in the corresponding beam indication DCI—e.g., DCI format 1_1/1_2 with or without DL assignment and/or DCI format 0_1/0_2), one or more joint/DL/UL TCI states for transmitting/receiving UL/DL channels/signals.

For example, the indicated one or more joint/DL/UL TCI states could correspond to a first TCI state(s) and a second TCI state(s), wherein the first TCI state(s) could correspond to the first SRI as described in this embodiment, and the second TCI state(s) could correspond to a second SRI according to those specified herein in the present disclosure. For this design example:

- In one example, when/if applicable/available, the UE could use the first SRI corresponding/associated to the first TCI state(s) to determine/identify a SRS resource from the SRS resource set indicated by the first SRSI indicated/provided, e.g., in the UL-related DCI (DCI format 0_1/0_2), and/or determine the corresponding UL TX beam(s)/spatial filter(s) for transmitting the determined/identified SRS resource; When/if applicable/available, the UE could use the second SRI corresponding/associated to the second TCI state(s) to determine/identify a SRS resource from the SRS resource set indicated by the second SRSI indicated/provided, e.g., in the UL-related DCI (DCI format 0_1/0_2), and/or determine the corresponding UL TX beam(s)/spatial filter(s) for transmitting the determined/identified SRS resource.
- In another example, when/if the first (or second) SRSI indicated/provided, e.g., in an UL-related DCI (DCI format 0_1/0_2), indicates that the first TCI state(s) could be used for transmitting the PUSCH(s), when/if applicable, the UE could use the first SRI-corresponding/associated to the first TCI state(s) according to those specified herein in the present disclosure—to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that the second TCI state(s) could be used for transmitting the PUSCH(s), when/if applicable, the UE could use the second SRI-corresponding/associated to the second TCI state(s) according to those specified herein in the present disclosure—to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that both of the first and second TCI states could be used for transmitting the PUSCH(s), when/if applicable, the UE could use both of the first and second SRIs-respectively corresponding/associated to the first and second TCI states according to those specified herein in the present disclosure—to determine/identify SRS resources from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resources.

For another example, the indicated one or more joint/DL/UL TCI states could correspond to a first TCI state(s) and a second TCI state(s), wherein only the first TCI state(s) could correspond to the first SRI according to those specified herein in the present disclosure (i.e., in this design example, the second TCI state(s) may not correspond to any SRI(s)). For this design example, In one example, when/if applicable/available, the UE could use the first SRI corresponding/associated to the first TCI state(s) to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

In another example, when/if the first (or second) SRSI indicated/provided, e.g., in an UL-related DCI (DCI format 0_1/0_2), indicates that at least the first TCI state(s) could be used for transmitting the PUSCH(s), when/if applicable, the UE could use at least the first SRI—corresponding/associated to the first TCI state(s) according to those specified herein in the present disclosure—to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

Yet for another example, the indicated one or more joint/DL/UL TCI states could correspond to a first TCI state(s) and a second TCI state(s), wherein only the second TCI state(s) could correspond to a second SRI according to those specified herein in the present disclosure (i.e., in this design example, the first TCI state(s) may not correspond to any SRI(s)). For this design example:

In one example, when/if applicable/available, the UE could use the second SRI corresponding/associated to the second TCI state(s) to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

In another example, when/if the first (or second) SRSI indicated/provided, e.g., in an UL-related DCI (DCI format 0_1/0_2), indicates that at least the second TCI state(s) could be used for transmitting the PUSCH(s), when/if applicable, the UE could use at least the second SRI—corresponding/associated to the second TCI state(s) according to those specified herein in the present disclosure—to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

Yet for another example, the indicated one or more joint/DL/UL TCI states could correspond to a first TCI state(s) according to those specified herein in the present disclosure, wherein the first TCI state(s) could correspond to the first SRI according to those specified herein in the present disclosure. For this design example:

In one example, when/if applicable/available, the UE could use the first SRI corresponding/associated to the first TCI state(s) to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

In another example, when/if the first (or second) SRSI indicated/provided, e.g., in an UL-related DCI (DCI format 0_1/0_2), indicates that at least the first TCI state(s) could be used for transmitting the PUSCH(s), when/if applicable, the UE could use at least the first SRI—corresponding/associated to the first TCI state(s) according to those specified herein in the present disclosure—to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

Yet for another example, the indicated one or more joint/DL/UL TCI states could correspond to a second TCI state(s) according to those specified herein in the present disclosure, wherein the second TCI state(s) could correspond to a second SRI according to those specified herein in the present disclosure. For this design example:

In one example, when/if applicable/available, the UE could use the second SRI corresponding/associated to the second TCI state(s) to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

In another example, when/if the first (or second) SRSI indicated/provided, e.g., in an UL-related DCI (DCI format 0_1/0_2), indicates that at least the second TCI state(s) could be used for transmitting the PUSCH(s), when/if applicable, the UE could use at least the second SRI—corresponding/associated to the second TCI state(s) according to those specified herein in the present disclosure—to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

Yet for another example, the indicated one or more joint/DL/UL TCI states could correspond to a first TCI state(s) and a second TCI state(s), wherein the first (or second) TCI state(s) could correspond to the first SRI and a second SRI according to those specified herein in the present disclosure. For this design example:

In one example, when/if applicable/available, the UE could use the first SRI corresponding/associated to the first (or second) TCI state(s) to determine/identify a SRS resource from the SRS resource set indicated by the first SRSI indicated/provided, e.g., in the UL-related DCI (DCI format 0_1/0_2), and/or determine the corresponding UL TX beam(s)/spatial filter(s) for transmitting the determined/identified SRS resource; when/if applicable/available, the UE could use the second SRI corresponding/associated to the first (or second) TCI state(s) to determine/identify a SRS resource from the SRS resource set indicated by the second SRSI indicated/provided, e.g., in the UL-related DCI (DCI format 0_1/0_2), and/or determine the corresponding UL TX beam(s)/spatial filter(s) for transmitting the determined/identified SRS resource.

In another example, when/if the first (or second) SRSI indicated/provided, e.g., in an UL-related DCI (DCI format 0_1/0_2), indicates that the first TCI state(s) could be used for transmitting the PUSCH(s), when/if applicable, the UE could use the first SRI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that the second TCI state(s) could be used for transmitting the PUSCH(s), when/if applicable, the UE could use the second SRI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that both of the first and second TCI states could be used for transmitting the PUSCH(s), when/if applicable, the UE could use both of the first and second SRIs to determine/identify SRS resources from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resources.

Yet for another example, the indicated one or more joint/DL/UL TCI states could correspond to a first (or second) TCI state(s) according to those specified herein in the present disclosure, wherein the first (or second) TCI state(s) could correspond to the first SRI and a second SRI according to those specified herein in the present disclosure. For this design example:

In one example, when/if applicable/available, the UE could use the first SRI corresponding/associated to the first (or second) TCI state(s) to determine/identify a SRS resource from the SRS resource set indicated by the first SRSI indicated/provided, e.g., in the UL-related DCI (DCI format 0_1/0_2), and/or determine the corresponding UL TX beam(s)/spatial filter(s) for transmitting the determined/identified SRS resource; when/if applicable/available, the UE could use the second SRI corresponding/associated to the first (or second) TCI state(s) to determine/identify a SRS resource from the SRS resource set indicated by the second SRSI indicated/provided, e.g., in the UL-related DCI (DCI format 0_1/0_2), and/or determine the corresponding UL TX beam(s)/spatial filter(s) for transmitting the determined/identified SRS resource.

In another example, when/if the first (or second) SRSI indicated/provided, e.g., in an UL-related DCI (DCI format 0_1/0_2), indicates that at least the first TCI state(s) could be used for transmitting the PUSCH(s), when/if applicable, the UE could use at least the first SRI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource; when/if the first (or second) SRSI indicated/provided, e.g., in an UL-related DCI (DCI format 0_1/0_2), indicates that at least the second TCI state(s) could be used for transmitting the PUSCH(s), when/if applicable, the UE could use at least the second SRI to determine/identify a SRS resource from the SRS resource set indicated by the first (or second) SRSI indicated/provided, e.g., in the UL-related DCI (DCI format 0_1/0_2), and/or determine the corresponding UL TX beam(s)/spatial filter(s) for transmitting the determined/identified SRS resource.

In one embodiment, a UE could be indicated/provided by the network, e.g., via a beam indication MAC CE/DCI (e.g., by a TCI codepoint of the TCI field in the corresponding beam indication DCI—e.g., DCI format 0_1/0_2 and/or DCI format 1_1/1_2 with or without DL assignment), one or more joint/DL/UL TCI states for transmitting/receiving UL/DL channels/signals. The UE could also receive from the network, e.g., in a DL-related DCI (e.g., DCI format 1_1/1_2) and/or an UL-related DCI (e.g., DCI format 0_1/0_2), a first SRSI and a first SRI, wherein the SRS resource indicated by the first SRI could be from the SRS resource set indicated by the first SRSI, and the UE could use/apply the first SRSI, when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s). Furthermore, the UE could receive from the network, e.g., in a DL-related DCI (e.g., DCI format 1_1/1_2) and/or an UL-related DCI (e.g., DCI format 0_1/0_2), a second SRI. The UE could receive and/or apply the second SRI (or equivalently, the DL-DCI and/or the UL-DCI that indicates/provides the second SRI) later in time than the reception and/or application of the first SRI (and therefore, the DL-DCI and/or the UL-DCI that indicates/provides the first SRI). The value(s) of the first SRI and the second SRI could be different. Furthermore, the first SRI and the second SRI could indicate SRS resources from different SRS resource sets or from the same SRS resource set. In addition to the solutions provided in the design examples specified herein in the present disclosure to address the UL beam(s)/panel(s) misalignment issue(s) for transmitting the PUSCH(s) and SRS(s):

In one example, when/if the DCI (e.g., a DL-DCI with format 1_1/1_2 or a UL-DCI with format 0_1/0_2) that provides/indicates a SRI that does not provide/indicate any SRSI, the UE could use/apply the SRI to determine/identify a SRS resource from the SRS resource set indicated by the latest received/applied SRSI, and/or determine the UL TX beam(s)/spatial filter(s) for transmitting the determined/identified SRS resource. Specifically, for the described design example herein, when/if the UE does not receive any SRSI(s) in the same DCI that provides/indicates the second SRI, the UE could use/apply the second SRI to determine/identify a SRS resource from the SRS resource set indicated by the first SRSI (the latest received/applied SRSI in this example), and/or determine the UL TX beam(s)/spatial filter(s) for transmitting the determined/identified SRS resource.

In another example, when/if the DCI (e.g., a DL-DCI with format 1_1/1_2 or a UL-DCI with format 0_1/0_2) that provides/indicates a SRI that does not provide/indicate any SRSI, the UE could first determine/identify a SRS resource set from which the SRI could be used to determine/identify a SRS resource; for this design example, the determination/identification could be based on/according to association(s)/mapping(s) between the SRI and the SRS resource set (e.g., based on the bitwidth and/or value of the SRI). For instance, the SRI bitwidth or value could be determined according to/based on the number of SRS resources configured across SRS resource sets; for instance, when/if a/the first SRS resource set comprising/configuring/providing a total of 8 SRS resources and a/the second SRS resource set comprising/configuring/providing a total of 8 SRS resources are configured/provided, the bitwidth of each SRI could be 4 for a total of 16 SRS resources across the two SRS resource sets, or the SRI values could be in a range from 0-15 (or from 1-16). For example, when/if the second SRI corresponds to 12, the UE could determine/identify that the second SRI actually provides/indicates a SRS resource from the second SRS resource set; When/if the second SRI corresponds to 1, the UE could determine/identify that the second SRI actually provides/indicates a SRS resource from the first SRS resource set. The UE could then identify/determine a second SRSI based on the determined/identified SRS resource set. The UE could use/apply the determined/identified second SRSI, when applicable, to determine/identify at least which (e.g., the first, the second, or both) of the applied joint/DL/UL TCI states—i.e., after the indicated one or more TCI states by/in the beam indication MAC CE/DCI have become applicable—to use for transmitting the PUSCH(s). Furthermore, the UE could use/apply the second SRI to determine/identify a SRS resource from the SRS resource set associated/corresponding to the determined/identified second SRSI, and/or determine the UL TX beam(s)/spatial filter(s) for transmitting the determined/identified SRS resource.

In yet another example, the UE could be indicated/provided/configured by the network, e.g., via higher layer RRC signaling(s)/parameter(s) and/or MAC CE command(s) and/or dynamic DCI based L1 signaling(s), that the indicated first SRI/SRSI (and therefore, the corresponding DCI that indicates/provides the first SRI/SRSI) and the indicated second SRI (and therefore, the corresponding DCI that indicates/provides the second SRI) are linked. For example, a linkage indicator, which could correspond to a new/dedicated indicator field in the corresponding DCI format(s) and/or one or more bits of one or more of the existing DCI fields in the corresponding DCI format(s)—e.g., via/by repurposing and/or network's configuration(s)/indication(s) field could be provided/indicated in the DCI (e.g., a DL-DCI format 1_1/1_2 and/or a UL-DCI format 0_1/0_2) that provides/indicates the SRI(s) and/or SRSI(s). For the described design example herein, when/if the linkage indicator(s) or the value(s) of the linkage indicator provided/indicated in the DCI that provides/indicates the first SRI/SRSI and the DCI that provides/indicates the second SRI is the same/identical, the first SRI/SRSI (and therefore, the corresponding DCI that indicates/provides the first SRI/SRSI) and the second SRI (and therefore, the corresponding DCI that provides/indicates the second SRI) are linked. Alternatively, the indicated first SRI/SRSI (and therefore, the corresponding DCI that indicates/provides the first SRI/SRSI) and the indicated second SRI (and therefore, the corresponding DCI that provides/indicates the second SRI) could be linked when/if one or more of the following conditions are achieved/satisfied: (i) the second SRI (and therefore, the corresponding DCI that provides/indicates the second SRI) is received/applied later in time than the first SRI/SRSI (and therefore, the corresponding DCI that provides/indicates the first SRI/SRSI), (2) the UE receives in the same DCI the first SRI and the first SRSI, and does not receive any SRSI(s) in the same DCI in which the UE receives the second SRI, (3) the UE could apply the same TCI state(s) for transmitting/receiving UL/DL channels/signals before/after the first SRI/SRSI and/or the second SRI are received/applied. For this design example, when/if the indicated first SRI/SRSI (and therefore, the corresponding DCI that indicates/provides the first SRI/SRSI) and the indicated second SRI (and therefore, the corresponding DCI that provides/indicates the second SRI) are linked, the UE could use/apply the second SRI to determine/identify a SRS resource from the SRS resource set indicated by the first SRSI (i.e., via the linkage), and/or determine the UL TX beam(s)/spatial filter(s) for transmitting the determined/identified SRS resource.

In yet another example, the UE could identify/determine the second SRI and the first SRI or, equivalently, differentiate between the first SRI and the second SRI according to one or more of: (1) the second SRI (and therefore, the corresponding DCI that provides/indicates the second SRI) is received/applied later in time than the first SRI (and therefore, the corresponding DCI that provides/indicates the first SRI), (2) the UE could apply the same TCI state(s) for transmitting/receiving UL/DL channels/signals before/after the first SRI and/or the second SRI are received/applied, and (3) the first indicated SRI (and therefore, the corresponding DCI that provides/indicates the first SRI) and the second indicated SRI (and therefore, the corresponding DCI that provides/indicates the second SRI) are linked, e.g., via network's configuration(s)/indication(s) through higher layer RRC signaling(s)/parameter(s) and/or MAC CE command(s) and/or dynamic DCI based L1 signaling(s).

For example, when/if applicable, the UE could use the first SRI to determine/identify a SRS resource from the SRS resource set indicated by the first SRSI indicated/provided, e.g., in an UL-related DCI (DCI format 0_1/0_2), and/or determine the corresponding UL TX beam(s)/spatial filter(s) for transmitting the determined/identified SRS resource; When/if applicable, the UE could use the second SRI to determine/identify a SRS resource from the SRS resource set indicated by the first SRSI indicated/provided, e.g., in an UL-related DCI (DCI format 0_1/0_2), and/or determine the corresponding UL TX beam(s)/spatial filter(s) for transmitting the determined/identified SRS resource.

For another example, when/if the first SRSI indicated/provided, e.g., in an UL-related DCI (DCI format 0_1/0_2), indicates that the first TCI state(s) could be used for transmitting the PUSCH(s), when/if applicable, the UE could use the first SRI to determine/identify a SRS resource from the SRS resource set indicated by the first SRSI indicated/provided, e.g., in the UL-related DCI (DCI format 0_1/0_2), and/or determine the corresponding UL TX beam(s)/spatial filter(s) for transmitting the determined/identified SRS resource; when/if the first SRSI indicated/provided, e.g., in an UL-related DCI (DCI format 0_1/0_2), indicates that the second TCI state(s) could be used for transmitting the PUSCH(s), when/if applicable, the UE could use the second SRI to determine/identify a SRS resource from the SRS resource set indicated by the first SRSI indicated/provided, e.g., in the UL-related DCI (DCI format 0_1/0_2), and/or determine the corresponding UL TX beam(s)/spatial filter(s) for transmitting the determined/identified SRS resource; when/if the first SRSI indicated/provided, e.g., in an UL-related DCI (DCI format 0_1/0_2), indicates that both of the first and second TCI states could be used for transmitting the PUSCH(s), when/if applicable, the UE could use both of the first and second SRIs to determine/identify SRS resources from the SRS resource set indicated by the first SRSI indicated/provided, e.g., in the UL-related DCI (DCI format 0_1/0_2), and/or determine the corresponding UL TX beam(s)/spatial filter(s) for transmitting the determined/identified SRS resources.

In one embodiment, as specified herein in the present disclosure, a UE (e.g., the UE 116) could receive from the network (e.g., the network 130), e.g., in a first DCI (e.g., a DL beam indication DCI with format 1_1/1_2 with or without DL assignment and/or a UL beam indication DCI with format 0_1/0_2 with or without UL assignment), one or more TCI states for DL/UL channels/signals reception(s)/transmission(s). The UE could also receive from the network, e.g., in a second DCI (e.g., a UL-related DCI with format 0_1/0_2 and/or a DL-related DCI with format 1_1/1_2), one or more SRIs and/or one or more SRSIs. For this case, the UE could be indicated/provided/configured by the network, e.g., via higher layer RRC signaling and/or MAC CE command and/or dynamic DCI based L1 signaling, a mapping/association relationship/rule between the first DCI that indicates/provides the one or more TCI states and the second DCI that indicates/provides the one or more SRIs/SRSIs as specified herein in the present disclosure. In one example, the UE could be provided/indicated by the network, e.g., in the first DCI, a first indicator, which could correspond to a new/dedicated indicator field in the corresponding DCI format(s) and/or one or more bits of one or more of the existing DCI fields in the corresponding DCI format(s)—e.g., via/by repurposing and/or network's configuration(s)/indication(s). The UE could also be provided/indicated by the network, e.g., in the second DCI, a second indicator, which could correspond to a new/dedicated indicator field in the corresponding DCI format(s) and/or one or more bits of one or more of the existing DCI fields in the corresponding DCI format(s)—e.g., via/by repurposing and/or network's configuration(s)/indication(s). In another example, instead of/in addition to indicating/providing the first indicator in the first DCI that provides/indicates the one or more TCI states, the first indicator could be indicated/provided/configured in higher layer RRC signaling(s)/parameter(s) and/or MAC CE command(s) and/or dynamic DCI based L1 signaling(s) that could be associated/corresponding to the first DCI and/or the one or more TCI states indicated/provided in the first DCI. Similarly, instead of/in addition to indicating/providing the second indicator in the second DCI that provides/indicates the one or more SRIs/SRSIs, the second indicator could be indicated/provided/configured in higher layer RRC signaling(s)/parameter(s) and/or MAC CE command(s) and/or dynamic DCI based L1 signaling(s) that could be associated/corresponding to the second DCI and/or the one or more SRIs/SRSIs indicated/provided in/by the second DCI. When/if the first indicator and the second indicator are common/identical (e.g., they have the same value(s)), the UE could use/apply the SRSI(s)—e.g., indicated/provided in the second DCI, when applicable, to determine/identify at least which (e.g., the first, the second, or both) of the applied joint/DL/UL TCI states—i.e., after the indicated one or more TCI states by/in the first DCI have become applicable—to use for transmitting the PUSCH(s). Furthermore, the UE could also use/apply the SRSI(s)—e.g., indicated/provided in the second DCI, when applicable, to determine/identify from which of the configured SRS resource sets, the SRS resource(s) identified/determined by the SRI(s) provided/indicated in the second DCI are identified/determined.

In one example, the UE could receive in the first DCI one or more TCI states (denoted by a/the first TCI state(s) and/or a/the second TCI state(s) as specified herein in the present disclosure) for transmitting/receiving UL/DL channels/signals. The UE could also receive in the second DCI a SRI (or a SRI codepoint/SRI codepoint index/ID comprising/corresponding to a SRI according to those specified herein in the present disclosure) and a SRSI. When/if the first and second DCI are linked according to those specified herein in the present disclosure, the UE could use/apply the SRSI indicated/provided in the second DCI, when applicable, to determine/identify at least which (e.g., the first, the second, or both) of the applied joint/DL/UL TCI states—i.e., after the indicated one or more TCI states by/in the first DCI have become applicable—to use for transmitting the PUSCH(s). Furthermore:

For example, when/if applicable/available, the UE could use the SRI indicated/provided in the second DCI to determine/identify a SRS resource from the SRS resource set indicated by the SRSI indicated/provided in the second DCI, and/or determine the corresponding UL TX beam(s)/spatial filter(s) for transmitting the determined/identified SRS resource.

For another example, the SRI indicated/provided in the second DCI could be associated/corresponding to at least the first TCI state(s) indicated/provided in the first DCI according to those specified herein in the present disclosure. For this case, when/if the SRSI indicated/provided in the second DCI indicates that at least the first TCI state(s) could be used for transmitting the PUSCH(s), when/if applicable/available, the UE could use at least the SRI indicated/provided in the second DCI to determine/identify a SRS resource from the SRS resource set indicated by the SRSI indicated/provided in the second DCI, and/or determine the corresponding UL TX beam(s)/spatial filter(s) for transmitting the determined/identified SRS resource.

Yet for another example, the SRI indicated/provided in the second DCI could be associated/corresponding to at least the second TCI state(s) indicated/provided in the first DCI according to those specified herein in the present disclosure. For this case, when/if the SRSI indicated/provided in the second DCI indicates that at least the second TCI state(s) could be used for transmitting the PUSCH(s), when/if applicable/available, the UE could use at least the SRI indicated/provided in the second DCI to determine/identify a SRS resource from the SRS resource set indicated by the SRSI indicated/provided in the second DCI, and/or determine the corresponding UL TX beam(s)/spatial filter(s) for transmitting the determined/identified SRS resource.

In another example, the UE could receive in the first DCI one or more TCI states (denoted by a/the first TCI state(s) and/or a/the second TCI state(s) as specified herein in the present disclosure) for transmitting/receiving UL/DL channels/signals. The UE could also receive in the second DCI a first SRI, a second SRI (or a SRI codepoint/SRI codepoint index/ID comprising/corresponding to a first SRI and a second SRI according to those specified herein in the present disclosure) and a SRSI. When/if the first and second DCI are linked according to those specified herein in the present disclosure, the UE could use/apply the SRSI indicated/provided in the second DCI, when applicable, to determine/identify at least which (e.g., the first, the second, or both) of the applied joint/DL/UL TCI states—i.e., after the indicated one or more TCI states by/in the first DCI have become applicable—to use for transmitting the PUSCH(s). Furthermore:

For example, when/if applicable, the UE could use the first SRI indicated/provided in the second DCI to determine/identify a SRS resource from the SRS resource set indicated by the SRSI indicated/provided in the second DCI, and/or determine the corresponding UL TX beam(s)/spatial filter(s) for transmitting the determined/identified SRS resource; When/if applicable, the UE could use the second SRI indicated/provided in the second DCI to determine/identify a SRS resource from the SRS resource set indicated by the SRSI indicated/provided in the second DCI, and/or determine the corresponding UL TX beam(s)/spatial filter(s) for transmitting the determined/identified SRS resource.

For another example, when/if the SRSI indicated/provided in the second DCI indicates that the first TCI state(s) could be used for transmitting the PUSCH(s), when/if applicable, the UE could use the first SRI indicated/provided in the second DCI to determine/identify a SRS resource from the SRS resource set indicated by the SRSI indicated/provided in the second DCI, and/or determine the corresponding UL TX beam(s)/spatial filter(s) for transmitting the determined/identified SRS resource; when/if the SRSI indicated/provided in the second DCI indicates that the second TCI state(s) could be used for transmitting the PUSCH(s), when/if applicable, the UE could use the second SRI indicated/provided in the second DCI to determine/identify a SRS resource from the SRS resource set indicated by the SRSI indicated/provided in the second DCI, and/or determine the corresponding UL TX beam(s)/spatial filter(s) for transmitting the determined/identified SRS resource; when/if the SRSI indicated/provided in the second DCI indicates that both of the first and second TCI states could be used for transmitting the PUSCH(s), when/if applicable, the UE could use both of the first and second SRIs indicated/provided in the second DCI to determine/identify SRS resources from the SRS resource set indicated by the SRSI indicated/provided in the second DCI, and/or determine the corresponding UL TX beam(s)/spatial filter(s) for transmitting the determined/identified SRS resources.

In one embodiment, as specified herein in the present disclosure, the UE could be indicated/provided by the network, e.g., via a TCI codepoint of a TCI field in a beam indication DCI (e.g., a DL-related DCI format 1_1/1_2 with or without DL assignment and/or a UL-related DCI format 0_1/0_2 with or without UL assignment), one or more joint/DL/UL TCI states-denoted by a/the first joint/DL/UL TCI state(s) and/or a/the second joint/DL/UL TCI state(s). The UE could also be indicated/provided by the network, e.g., via a DL-related DCI (e.g., DCI format 1_1/1_2) and/or a UL-related DCI (e.g., DCI format 0_1/0_2), one or more SRIs—e.g., denoted by a/the first SRI and/or a/the second SRI. For example, the one or more TCI states (e.g., the first TCI state(s) and/or the second TCI state(s)) and the one or more SRIs (e.g., the first SRI and/or the second SRI) could be provided/indicated in a/the same DCI. For another example, the one or more TCI states (e.g., the first TCI state(s) and/or the second TCI state(s)) and the one or more SRIs (e.g., the first SRI and/or the second SRI) could be indicated/provided in separate DCIs; for this case, the one or more indicated TCI states and the one or more indicated SRIs could be linked/associated to each other according to those specified herein in the present disclosure (e.g., the DCIs that indicate/provide the one or more TCI states and the one or more SRIs could be linked/associated to each other according to those specified herein in the present disclosure).

In one example, the indicated one or more SRIs could correspond to a single SRI. The UE could first identify/determine, e.g., based on/according to network's configuration(s)/indication(s), e.g., via higher layer RRC signaling(s)/parameter(s) and/or MAC CE command(s) and/or dynamic DCI based L1 signaling(s), that the indicated SRI could correspond to a/the first SRI or a/the second SRI following those specified herein in the present disclosure. When/if the indicated SRI corresponds to a/the first SRI, the UE could use/apply at least the first applied joint/DL/UL TCI state(s)—i.e., after the indicated one or more TCI states by/in the beam indication DCI have become applicable—to use for transmitting the PUSCH(s); When/if the indicated SRI corresponds to a/the second SRI, the UE could use/apply at least the second applied joint/DL/UL TCI state(s)—i.e., after the indicated one or more TCI states by/in the beam indication DCI have become applicable—to use for transmitting the PUSCH(s).

In another example, the indicated one or more SRIs could correspond to a single SRI. The UE could also be configured/provided by the network, e.g., via higher layer RRC signaling(s)/parameter(s) and/or MAC CE command(s) and/or dynamic DCI based L1 signaling(s), one or more SRS resource sets denoted by a/the first SRS resource set and/or a/the second SRS resource set. For this design example, the UE could first determine/identify a SRS resource set from which the SRI could be used to determine/identify a SRS resource; here, the determination/identification could be based on/according to association(s)/mapping(s) between the SRI and the SRS resource set (e.g., based on the bitwidth and/or value of the SRI). For instance, the SRI bitwidth or value could be determined according to/based on the number of SRS resources configured across both of the first and the second SRS resource sets; for instance, when/if a/the first SRS resource set comprising/configuring/providing a total of 8 SRS resources and a/the second SRS resource set comprising/configuring/providing a total of 8 SRS resources are configured/provided, the bitwidth of each SRI could be 4 for a total of 16 SRS resources across the two SRS resource sets, or the SRI values could be in a range from 0-15 (or from 1-16). For example, when/if the indicated SRI corresponds to 12, the UE could determine/identify that the indicated SRI actually provides/indicates a SRS resource from the second SRS resource set; When/if the indicated SRI corresponds to 1, the UE could determine/identify that the indicated SRI actually provides/indicates a SRS resource from the first SRS resource set. When/if the SRI indicates a SRS resource from the first SRS resource set, the UE could use/apply at least the first applied joint/DL/UL TCI state(s)—i.e., after the indicated one or more TCI states by/in the beam indication DCI have become applicable—to use for transmitting the PUSCH(s); When/if the SRI indicates a SRS resource from the second SRS resource set, the UE could use/apply at least the second applied joint/DL/UL TCI state(s)—i.e., after the indicated one or more TCI states by/in the beam indication DCI have become applicable—to use for transmitting the PUSCH(s).

In yet another example, the indicated one or more SRIs could comprise a/the first SRI and a/the second SRI. The UE could also be configured/provided by the network, e.g., via higher layer RRC signaling(s)/parameter(s) and/or MAC CE command(s) and/or dynamic DCI based L1 signaling(s), one or more SRS resource sets denoted by a/the first SRS resource set and/or a/the second SRS resource set. For this design example, the first SRI could indicate a SRS resource from the first SRS resource set, and the second SRI could indicate a SRS resource from the second SRS resource set. Here, when/if the indicated one or more SRIs comprise the first and the second SRIs as specified herein in the present disclosure, the UE could use/apply both of the first and the second applied joint/DL/UL TCI states—i.e., after the indicated one or more TCI states by/in the beam indication DCI have become applicable—to use for transmitting the PUSCH(s).

```
TCI-State ::=        SEQUENCE {
  tci-StateId          TCI-StateId,
  qcl-Type1              QCL-Info,
  qcl-Type2              QCL-Info          OPTIONAL, -- Need R
    ...,
  sri-Index          ENUMERATED {first,                 OPTIONAL,
                     second, both}
  ...
}
```

In one embodiment, as specified herein in the present disclosure, a UE could be indicated/provided by the network, e.g., via a TCI codepoint of a TCI field in a beam indication DCI (e.g., a DL-related DCI format 1_1/1_2 with or without DL assignment and/or a UL-related DCI format 0_1/0_2 with or without UL assignment), one or more joint/DL/UL TCI states-denoted by a/the first joint/DL/UL TCI state(s) and/or a/the second joint/DL/UL TCI state(s). The UE could receive from the network one or more sets of SRIs, e.g., via the SRI(s) activation/deactivation MAC CE as illustrated in FIG. 10, wherein each set could comprise one or more SRIs—e.g., denoted by a/the first SRI and/or a/the second SRI, and each set could be used to map to a SRI codepoint of a SRI field in a DCI—e.g., the DCI could be of DCI format 1_1/1_2 with or without DL assignment and/or DCI format 0_1/0_2 with or without UL assignment. The UE could then be indicated/provided by the network, e.g., via a SRI codepoint of a SRI field in a DCI, one or more SRIs. For example, the one or more TCI states (e.g., the first TCI state(s) and/or the second TCI state(s)) and the one or more SRIs (e.g., the first SRI and/or the second SRI) could be provided/indicated in a/the same DCI. For another example, the one or more TCI states (e.g., the first TCI state(s) and/or the second TCI state(s)) and the one or more SRIs (e.g., the first SRI and/or the second SRI) could be indicated/provided in separate DCIs; for this case, the one or more indicated TCI states and the one or more indicated SRIs could be linked/associated to each other according to those specified herein in the present disclosure (e.g., the DCIs that indicate/provide the one or more TCI states and the one or more SRIs could be linked/associated to each other according to those specified herein in the present disclosure). Furthermore, higher layer parameter(s) such as TCI-State, DLorJointTCI-State, UL-TCIState and/or QCL-Info that configures/provides a joint/DL/UL TCI state could provide/contain/include/comprise/indicate an indicator-denoted by SRI(s) index indicator-indicating whether the joint/DL/UL TCI state could be associated/corresponding to one or more SRIs, and/or whether the one or more SRIs associated/corresponding to the joint/DL/UL TCI state could correspond to a/the first SRI, a/the second SRI and/or both of the first and second SRIs. A snippet of the higher layer parameter TCI-State is provided herein in the present disclosure, which contains/provides/indicates/comprises/configures the SRI(s) index indicator as described herein in the present disclosure.

In one example, the UE could be configured/provided by the network, e.g., via higher layer RRC signaling(s)/parameter(s) and/or MAC CE command(s) and/or dynamic DCI based L1 signaling(s), one or more SRS resource sets denoted by a/the first SRS resource set and/or a/the second SRS resource set. The UE could be indicated/provided by the network, e.g., via a SRI codepoint of a SRI field in a DCI, a single SRI. Furthermore, the UE could identify/determine a SRI index from the indicated one or more joint/DL/UL TCI states according to those specified herein in the present disclosure (e.g., following the SRI(s) index indicator provided in TCI-State). When/if the SRI(s) index indicator is set to 'first' or '0' or '00', the UE could use the indicated SRI to determine/identify a SRS resource from the first SRS resource set, and/or determine the corresponding UL TX beam(s)/spatial filter(s) for transmitting the determined/identified SRS resource; when/if the SRI(s) index indicator is set to 'second' or '1' or '01', the UE could use the indicated SRI to determine/identify a SRS resource from the second SRS resource set, and/or determine the corresponding UL TX beam(s)/spatial filter(s) for transmitting the determined/identified SRS resource. For this design example, when/if the UE is provided/configured by the network, e.g., via higher layer RRC signaling(s)/parameter(s) and/or MAC CE command(s) and/or dynamic DCI based L1 signaling(s), a single SRS resource set, the UE could use the indicated SRI to determine/identify a SRS resource from the SRS resource set, and/or determine the corresponding UL TX beam(s)/spatial filter(s) for transmitting the determined/identified SRS resource, regardless of the SRI(s) index indicator from the one or more indicated TCI states.

FIG. 12 illustrates a table 1200 of example mapping between SRI codepoints and SRS resource sets for identifying/determining SRS resources according to embodiments of the present disclosure. For example, table 1200 of example mapping between SRI codepoints and SRS resource sets for identifying/determining SRS resources may be referenced by any of the UEs 111-116 of FIG. 1, such as the UE 115 of FIG. 1. This example is for illustration only and other embodiments can be used without departing from the scope of the present disclosure.

In another example, with reference to FIG. 12, the UE could be configured/provided by the network, e.g., via higher layer RRC signaling(s)/parameter(s) and/or MAC CE command(s) and/or dynamic DCI based L1 signaling(s), one or more SRS resource sets denoted by a/the first SRS resource set and/or a/the second SRS resource set. The UE could be indicated/provided by the network, e.g., via a SRI codepoint of a SRI field in a DCI, a/the first SRI and a/the second SRI. Furthermore, the UE could identify/determine a SRI index from the indicated one or more joint/DL/UL TCI states according to those specified herein in the present disclosure (e.g., following the SRI(s) index indicator provided in TCI-State). When/if the SRI(s) index indicator is set to 'first' or '0' or '00', the UE could use the indicated first SRI to determine/identify a SRS resource from the first SRS resource set, and/or determine the corresponding UL TX beam(s)/spatial filter(s) for transmitting the determined/identified SRS resource; when/if the SRI(s) index indicator is set to 'second' or '1' or '01', the UE could use the indicated second SRI to determine/identify a SRS resource from the second SRS resource set, and/or determine the corresponding UL TX beam(s)/spatial filter(s) for transmitting the determined/identified SRS resource; when/if the SRI(s) index indicator is set to 'both' or '10' or '11', the UE could use the indicated first SRI to determine/identify a first SRS resource from the first SRS resource set, and the indicated second SRI to determine/identify a second SRS resource from the second SRS resource set, and/or determine the corresponding UL TX beam(s)/spatial filter(s) for transmitting the determined/identified first and second SRS resources.

In yet another example, the UE could be configured/provided by the network, e.g., via higher layer RRC signaling(s)/parameter(s) and/or MAC CE command(s) and/or dynamic DCI based L1 signaling(s), a single SRS resource set. The UE could be indicated/provided by the network, e.g., via a SRI codepoint of a SRI field in a DCI, a/the first SRI and a/the second SRI. Furthermore, the UE could identify/determine a SRI index from the indicated one or more joint/DL/UL TCI states according to those specified herein in the present disclosure (e.g., following the SRI(s) index indicator provided in TCI-State). When/if the SRI(s) index indicator is set to 'first' or '0' or '00', the UE could use the indicated first SRI to determine/identify a SRS resource from the SRS resource set, and/or determine the corresponding UL TX beam(s)/spatial filter(s) for transmitting the determined/identified SRS resource; when/if the SRI(s) index indicator is set to 'second' or '1' or '01', the UE could use the indicated second SRI to determine/identify a SRS resource from the SRS resource set, and/or determine the corresponding UL TX beam(s)/spatial filter(s) for transmitting the determined/identified SRS resource; when/if the SRI(s) index indicator is set to 'both' or '10' or '11', the UE could use the indicated first and second SRIs to determine/identify SRS resources from the SRS resource set, and/or determine the corresponding UL TX beam(s)/spatial filter(s) for transmitting the determined/identified SRS resources.

As specified herein in the present disclosure, for/in the one or more described design examples herein, the second indicator or the TCI selection field (if present) in the DL-related DCI format 1_1/1_2 for indicating which (e.g., the first, second or both) of the indicated/applied joint/DL/UL TCI states to use/apply for receiving the PDSCH(s) could be repurposed—e.g., based on network's configuration(s)/indication(s)—to indicate one or more SRIs, one or more SRI indication fields, one or more SRI codepoints/SRI codepoint indexes/IDs, and/or etc. Furthermore, as specified herein in the present disclosure, the second indicator or the TCI selection field (if present) in the DL-related DCI format 1_1/1_2 for indicating which (e.g., the first, second or both) of the indicated/applied joint/DL/UL TCI states to use/apply for receiving the PDSCH(s) could be repurposed/used—e.g., based on network's configuration(s)/indication(s)—to indicate which (e.g., the first, second or both) of the indicated/applied joint/DL/UL TCI states to use/apply for transmitting the PUSCH(s)—i.e., throughout the present disclosure, the fourth indicator/SRSI (e.g., provided/indicated in an UL-DCI) could be replaced by the second indicator/TCI selection field (e.g., provided/indicated in a DL-DCI) to indicate, e.g., which (e.g., the first, second or both) of the indicated/applied joint/DL/UL TCI states to use/apply for transmitting the PUSCH(s), and/or one or more SRS resource sets (e.g., the first SRS resource set and/or the second SRS resource set).

As specified herein in the present disclosure, for/in the one or more described design examples herein, a UE could receive from the network a (unified) TCI state(s) activation/deactivation MAC CE providing/indicating/activating one or more joint/DL/UL TCI states/sets of joint/DL/UL TCI states, wherein each TCI state/set of TCI states could be used to map to a TCI codepoint of a TCI field in a beam indication DCI, and each set of joint/DL/UL TCI states could comprise one or more joint/DL/UL TCI states. The UE could then be indicated/provided by the network, e.g., via a TCI codepoint of a TCI field in a beam indication DCI, one or more joint/DL/UL TCI states for receiving/transmitting DL/UL channels/signals. Here, the beam indication DCI could correspond to an UL-related DCI, e.g., DCI format 0_1/0_2 with or without UL assignment. In the UL-DCI (e.g., DCI format 0_1/0_2) for beam indication, the DCI field used to indicate the TCI codepoint could correspond to a new/dedicated indicator field—e.g., a 'TCI indication'/'TCI state'/'TCI' field in the corresponding DCI format(s)—e.g., DCI format 0_1/0_2. Optionally, the DCI field used to indicate the TCI codepoint could correspond to one or more bits of one or more of the existing DCI fields (e.g., the SRI field and/or the SRSI field) in the corresponding DCI format(s) such as 0_1/0_2—e.g., via/by repurposing and/or network's configuration(s)/indication(s). Furthermore, the DCI field used to indicate the TCI codepoint (e.g., the TCI field) in the UL beam indication DCI (e.g., DCI format 0_1/0_2) could be a separate/different field from the SRI/SRSI field(s), or jointly with the SRI/SRSI field(s).

A UE (e.g., the UE 116) could report/indicate to the network (e.g., the network 130), e.g., in part of CSI/beam report and/or their capability signaling(s), whether the UE could be able to support or capable of supporting which one or more of the design examples specified herein in the present disclosure. Furthermore, the UE could be indicated/provided/configured by the network, e.g., via higher layer RRC signaling(s)/parameter(s) and/or MAC CE command(s) and/or dynamic DCI based L1 signaling(s), to use/apply which one or more of the design examples specified herein in the present disclosure. Optionally, the UE could use/apply one or more of the design examples specified herein in the present disclosure when/if the SRSI(s)/fourth indicator(s) as specified herein in the present disclosure indicates/provides that the indicated/applied first TCI state(s) or the indicated/applied second TCI state(s) could be used for transmitting the PUSCH(s)—e.g., the SRSI or the fourth indicator is set to '00' or '01'; i.e., the UE could use/apply one or more of the design examples specified herein in the present disclosure when/if the SRSI(s)/fourth indicator as specified herein in the present disclosure does not indicate/provide that both of the indicated/applied first and second TCI states could be used for transmitting the PUSCH(s)—e.g., the SRSI or the fourth indicator is not set to '10' or '11'. Throughout the present disclosure, the SRI bitwidth or value could be determined according to/based on the number of SRS resources configured across SRS resource sets; for instance, when/if a/the first SRS resource set comprising/configuring/providing a total of 8 SRS resources and a/the second SRS resource set comprising/configuring/providing a total of 8 SRS resources are configured/provided, the bitwidth of each SRI could be 4 for a total of 16 SRS resources across the two SRS resource sets, or the SRI values could be in a range from 0-15 (or from 1-16). Optionally, the SRI bitwidth or value could be determined according to/based on the number of SRS resources configured in each individual SRS resource set; for instance, when/if a/the first SRS resource set comprising/configuring/providing a total of 8 SRS resources and a/the second SRS resource set comprising/configuring/providing a total of 8 SRS resources are configured/provided, the bitwidth of each SRI could be 3 for a total of 8 SRS resources in each individual SRS resource set, or the SRI values could be in a range from 0-7 (or from 1-8) for each individual SRS resource set. In addition, the UL-DCI (e.g., DCI format 0_1/0_2) used throughout the present disclosure can be replaced by DL-DCI (e.g., DCI format 1_1/1_2); for instance, the SRI(s), SRI codepoint(s)/SRI codepoint index(es)/ID(s), SRSI(s) and/or etc. indicated/provided in an UL-related DCI (e.g., DCI format 0_1/0_2) could be indicated/provided in a DL-related DCI (e.g., beam indication DCI format 1_1/1_2 with or without DL assignment). Similarly, the DL-DCI (e.g., DCI format 1_1/1_2) used throughout the present disclosure can be replaced by UL-DCI (e.g., DCI format 0_1/0_2); for instance, the one or more TCI states indicated/provided in a DL beam indication DCI (e.g., DCI format 1_1/1_2 with or without DL assignment) could be indicated/provided in a UL-related DCI (e.g., DCI format 0_1/0_2)—e.g., via a dedicated TCI field or by repurposing one or more bits of one or more existing DCI fields—as specified herein in the present disclosure.

Throughout the present disclosure, the UE could be configured, provided or indicated by the network, e.g., via higher layer RRC signaling(s)/parameter(s) and/or MAC CE command(s) and/or dynamic DCI based L1 signaling(s), presence or absence of the SRI in the corresponding DCI format(s)—e.g., in a DL-related DCI format as specified/defined herein in the present disclosure. For instance, when/if the UE receives from the network, a higher layer signaling/parameter sriPresent_InDCI and/or set to 'enabled', the UE could expect that the SRI is present in the corresponding DCI format(s)—e.g., a DL-related DCI format—as specified/defined herein in the present disclosure; otherwise, i.e., when/if the UE is not provided the higher layer signaling/parameter sriPresent_InDCI (set to 'enabled') and/or is provided the higher layer signaling/parameter sriPresent_InDCI but set to 'disabled', the UE may not expect that the SRI is present or the UE could expect the SRI is absent or not present in the corresponding DCI format(s)—e.g., a DL-related DCI format—as specified/defined herein in the present disclosure.

Throughout the present disclosure, the UE could be configured, provided or indicated by the network, e.g., via higher layer RRC signaling(s)/parameter(s) and/or MAC CE command(s) and/or dynamic DCI based L1 signaling(s), presence or absence of the SRSI in the corresponding DCI format(s)—e.g., in a DL-related DCI format as specified/defined herein in the present disclosure. For instance, when/if the UE receives from the network, a higher layer signaling/parameter srsiPresent_InDCI and/or set to 'enabled', the UE could expect that the SRSI is present in the corresponding DCI format(s)—e.g., a DL-related DCI format—as specified/defined herein in the present disclosure; otherwise, i.e., when/if the UE is not provided the higher layer signaling/parameter srsiPresent_InDCI (set to 'enabled') and/or is provided the higher layer signaling/parameter srsiPresent_InDCI but set to 'disabled', the UE may not expect that the SRSI is present or the UE could expect the SRSI is absent or not present in the corresponding DCI format(s)—e.g., a DL-related DCI format—as specified/defined herein in the present disclosure.

Throughout the present disclosure, the UE could be configured, provided or indicated by the network, e.g., via higher layer RRC signaling(s)/parameter(s) and/or MAC CE command(s) and/or dynamic DCI based L1 signaling(s), presence or absence of the TCI field in the corresponding DCI format(s)—e.g., in an UL-related DCI format as specified/defined herein in the present disclosure. For instance, when/if the UE receives from the network, a higher layer signaling/parameter tciPresent_InDCI and/or set to 'enabled', the UE could expect that the TCI field is present in the corresponding DCI format(s)—e.g., an UL-related DCI format—as specified/defined herein in the present disclosure; otherwise, i.e., when/if the UE is not provided the higher layer signaling/parameter tciPresent_InDCI (set to 'enabled') and/or is provided the higher layer signaling/parameter tciPresent_InDCI but set to 'disabled', the UE may not expect that the TCI field is present or the UE could expect the TCI field is absent or not present in the corresponding DCI format(s)—e.g., an UL-related DCI format—as specified/defined herein in the present disclosure.

When a UE, e.g., configured with dl-O) rJointTCI-StateList, would transmit a PUCCH with positive HARQ-ACK or a PUSCH with positive HARQ-ACK corresponding to the DCI carrying the TCI State indication, the SRI and without DL assignment, or corresponding to the PDSCH scheduled by the DCI carrying the TCI State indication and the SRI, and if the indicated TCI State(s)/SRI(s)—i.e., the corresponding SRS resource(s)—is/are different from the previously indicated one(s), the indicated TOI-State(s) and/or TCI-UL-State(s) and/or SRI(s)—i.e., the corresponding SRS resource(s)—could be applied starting from the first slot that is at least beamAppTime symbols after the last symbol of the PUCCH or the PUSCH, and if the UE receives more than one indicated TCI state and/or more than one SRI for a CC/BWP to be applied starting from the first slot that is at least beamAppTime symbols after the last symbol of the PUCCH or the PUSCH, the indicated TCI state or SRI (SRS resource) carried in the latest DCI, for the corresponding coresetPoolIndex value when applicable, in time corresponding to positive HARQ-ACK value is applied. The first slot and the beamAppTime symbols are both determined on the active BWP with the smallest SCS among the BWP(s) from the CCs applying the indicated TOI-State(s) or TCI-UL-State(s) and/or SRI (SRS resource) that are active at the end of the PUCCH or the PUSCH carrying the positive HARQ-ACK.

When a UE, e.g., configured with dl-OrJointTOI-StateList, would transmit a PUCCH with positive HARQ-ACK or a PUSCH with positive HARQ-ACK corresponding to the DCI carrying the TCI State indication, the SRSI and without DL assignment, or corresponding to the PDSCH scheduled by the DCI carrying the TCI State indication and the SRSI, and if the indicated TCI State(s)/SRSI(s)—i.e., the corresponding SRS resource set(s)—is/are different from the previously indicated one(s), the indicated TCI-State(s) and/or TCI-UL-State(s) and/or SRSI(s)—i.e., the corresponding SRS resource set(s)—could be applied starting from the first slot that is at least beamAppTime symbols after the last symbol of the PUCCH or the PUSCH, and if the UE receives more than one indicated TCI state and/or more than one SRSI for a CC/BWP to be applied starting from the first slot that is at least beamAppTime symbols after the last symbol of the PUCCH or the PUSCH, the indicated TCI state or SRSI (SRS resource set) carried in the latest DCI, for the corresponding coresetPoolIndex value when applicable, in time corresponding to positive HARQ-ACK value is applied. The first slot and the beamAppTime symbols are both determined on the active BWP with the smallest SCS among the BWP(s) from the CCs applying the indicated TCI-State(s) or TCI-UL-State(s) and/or SRSI (SRS resource set) that are active at the end of the PUCCH or the PUSCH carrying the positive HARQ-ACK.

FIG. 13 illustrates an example method 1300 performed by a UE in a wireless communication system according to embodiments of the present disclosure. The method 1300 of FIG. 13 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1300 is for illustration only and other embodiments can be used without departing from the scope of the present disclosure.

The method 1300 begins with the UE receiving, in a DCI format, a SRI and a TCI codepoint mapped to one or more first TCI states (1310). For example, in 1310, the DCI format is a DL related DCI format or an UL related DCI format. In various embodiments, when the DCI format is the DL related DCI format, the DCI format includes a 'SRS resource indicator' field indicating the SRI; and when the DCI format is the UL related DCI format, the DCI format includes a 'Transmission configuration indication' field indicating the TCI codepoint. In various embodiments, when the DCI format is the DL related DCI format, the UE receives a first RRC signaling indicating a presence or absence of the 'SRS resource indicator' field in the DCI format; and when the DCI format is the UL related DCI format, the UE receives a second RRC signaling indicating a presence or absence of the 'Transmission configuration indication' field in the DCI format.

The UE then determines, based on the SRI, a SRS resource and a PUSCH associated with the SRS resource (1320). The UE then determines, based on the one or more first TCI states, a spatial filter for transmitting the PUSCH (1330). In various embodiments, the UE receives information related to a first SRS resource set and a second SRS resource set, the DCI format further includes a SRSI, the SRS resource and the associated PUSCH are determined based on the SRSI, the UE identifies, based on the SRSI, one or more second TCI states from the one or more first TCI states, and the spatial filter for transmitting the PUSCH is determined based on the one or more second TCI states.

In various embodiments, when the DCI format is a DL related DCI format, the DCI format includes a 'SRS resource set indicator' field indicating the SRSI; and the UE receives a RRC signaling indicating a presence or absence of the 'SRS resource set indicator' field in the DCI format. In various embodiments, when the SRSI is set to '00', the SRI indicates the SRS resource is from the first SRS resource set; and when the SRSI is set to '01', the SRI indicates the SRS resource is from the second SRS resource set. In various embodiments, when the SRSI is set to '00', a first TCI state from the one or more first TCI states corresponds to the one or more second TCI states; when the SRSI is set to '01', a second TCI state from the one or more first TCI states corresponds to the one or more second TCI states; and when the SRSI is set to '10' or '11', the first and second TCI states from the one or more first TCI states correspond to the one or more second TCI states. The UE then transmits the PUSCH using the determined spatial filter (1340).

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE), comprising:

a transceiver configured to receive, in a downlink control information (DCI) format, (i) a sounding reference signal resource indicator (SRI) and (ii) a transmission configuration indication (TCI) codepoint mapped to one or more first TCI states; and a processor operably coupled with the transceiver, the processor configured to:

determine, based on the SRI, a sounding reference signal (SRS) resource and a physical uplink shared channel (PUSCH) associated with the SRS resource; and determine, based on the one or more first TCI states, a spatial filter for transmitting the PUSCH, wherein the transceiver is further configured to transmit the PUSCH using the determined spatial filter, and wherein:

the transceiver is further configured to, when the DCI format is a downlink (DL) related DCI format, receive a first radio resource control (RRC) signaling indicating a presence or absence of a 'SRS resource indicator' field in the DCI format; and the transceiver is further configured to, when the DCI format is an uplink (UL) related DCI format, receive a second RRC signaling indicating a presence or absence of a 'Transmission configuration indication' field in the DCI format.

2. The UE of claim 1, wherein:

the transceiver is further configured to receive information related to a first SRS resource set and a second SRS resource set;

the DCI format further includes a SRS resource set indicator (SRSI);

the SRS resource and the associated PUSCH are determined based on the SRSI;

the processor is further configured to identify, based on the SRSI, one or more second TCI states from the one or more first TCI states; and the spatial filter for transmitting the PUSCH is determined based on the one or more second TCI states.

3. The UE of claim 2, wherein:

when the DCI format is a downlink (DL) related DCI format, the DCI format includes a 'SRS resource set indicator' field indicating the SRSI; and the transceiver is further configured to receive a radio resource control (RRC) signaling indicating a presence or absence of the 'SRS resource set indicator' field in the DCI format.

4. The UE of claim 2, wherein:

when the SRSI is set to '00', the SRI indicates the SRS resource is from the first SRS resource set; and when the SRSI is set to '01', the SRI indicates the SRS resource is from the second SRS resource set.

5. The UE of claim 2, wherein:

when the SRSI is set to '00', a first TCI state from the one or more first TCI states corresponds to the one or more second TCI states;

when the SRSI is set to '01', a second TCI state from the one or more first TCI states corresponds to the one or more second TCI states; and when the SRSI is set to '10' or '11', the first and second TCI states from the one or more first TCI states correspond to the one or more second TCI states.

6. A base station (BS), comprising:

a transceiver configured to transmit, in a downlink control information (DCI) format, (i) a sounding reference signal resource indicator (SRI) and (ii) a transmission configuration indication (TCI) codepoint mapped to one or more first TCI states, wherein the SRI indicates a sounding reference signal (SRS) resource and a physical uplink shared channel (PUSCH) associated with the SRS resource; and a processor operably coupled with the transceiver, the processor configured to determine, based on the one or more first TCI states, a spatial filter for receiving the PUSCH, wherein the transceiver is further configured to receive the PUSCH using the determined spatial filter, and wherein:

the transceiver is further configured to, when the DCI format is a downlink (DL) related DCI format, transmit a first radio resource control (RRC) signaling indicating a presence or absence of a 'SRS resource indicator' field in the DCI format; and the transceiver is further configured to, when the DCI format is an uplink (UL) related DCI format, transmit a second RRC signaling indicating a presence or absence of a 'Transmission configuration indication' field in the DCI format.

7. The BS of claim 6, wherein:

the transceiver is further configured to transmit information related to a first SRS resource set and a second SRS resource set;

the DCI format further includes a SRS resource set indicator (SRSI);

the SRS resource and the associated PUSCH are based on the SRSI;

the SRSI indicates one or more second TCI states from the one or more first TCI states; and the spatial filter for receiving the PUSCH is based on the one or more second TCI states.

8. The BS of claim 7, wherein:

when the DCI format is a downlink (DL) related DCI format, the DCI format includes a 'SRS resource set indicator' field indicating the SRSI; and the transceiver is further configured to transmit a radio resource control (RRC) signaling indicating a presence or absence of the 'SRS resource set indicator' field in the DCI format.

9. The BS of claim 7, wherein:

when the SRSI is set to '00', the SRI indicates the SRS resource is from the first SRS resource set; and when the SRSI is set to '01', the SRI indicates the SRS resource is from the second SRS resource set.

10. The BS of claim 7, wherein:

when the SRSI is set to '00', a first TCI state from the one or more first TCI states corresponds to the one or more second TCI states;

when the SRSI is set to '01', a second TCI state from the one or more first TCI states corresponds to the one or more second TCI states; and when the SRSI is set to '10' or '11', the first and second TCI states from the one or more first TCI states correspond to the one or more second TCI states.

11. A method performed by a user equipment (UE), the method comprising:

receiving, in a downlink control information (DCI) format, (i) a sounding reference signal resource indicator (SRI) and (ii) a transmission configuration indication (TCI) codepoint mapped to one or more first TCI states;

determining, based on the SRI, a sounding reference signal (SRS) resource and a physical uplink shared channel (PUSCH) associated with the SRS resource;

determining, based on the one or more first TCI states, a spatial filter for transmitting the PUSCH;

transmitting the PUSCH using the determined spatial filter;

when the DCI format is a downlink (DL) related DCI format, receiving a first radio resource control (RRC) signaling indicating a presence or absence of a 'SRS resource indicator' field in the DCI format; and when the DCI format is an uplink (UL) related DCI format, receiving a second RRC signaling indicating a presence or absence of a 'Transmission configuration indication' field in the DCI format.

12. The method of claim 11, further comprising:

receiving information related to a first SRS resource set and a second SRS resource set, wherein the DCI format further includes a SRS resource set indicator (SRSI) and wherein the SRS resource and the associated PUSCH are determined based on the SRSI; and identifying, based on the SRSI, one or more second TCI states from the one or more first TCI states, wherein the spatial filter for transmitting the PUSCH is determined based on the one or more second TCI states.

13. The method of claim 12, wherein:

when the DCI format is a downlink (DL) related DCI format, the DCI format includes a 'SRS resource set indicator' field indicating the SRSI; and the method further comprises receiving a radio resource control (RRC) signaling indicating a presence or absence of the 'SRS resource set indicator' field in the DCI format.

14. The method of claim 12, wherein:

when the SRSI is set to '00', the SRI indicates the SRS resource is from the first SRS resource set; and when the SRSI is set to '01', the SRI indicates the SRS resource is from the second SRS resource set.

15. The method of claim 12, wherein:

when the SRSI is set to '00', a first TCI state from the one or more first TCI states corresponds to the one or more second TCI states;

when the SRSI is set to '01', a second TCI state from the one or more first TCI states corresponds to the one or more second TCI states; and when the SRSI is set to '10' or '11', the first and second TCI states from the one or more first TCI states correspond to the one or more second TCI states.

* * * * *